United States Patent
Palumbo et al.

(10) Patent No.: US 10,916,784 B2
(45) Date of Patent: Feb. 9, 2021

(54) SOFC-CONDUCTION

(71) Applicant: Upstart Power, Inc., Southborough, MA (US)

(72) Inventors: Nathan Palumbo, West Boylston, MA (US); Paul Osenar, Boxborough, MA (US); Joshua Persky, Berlin, MA (US)

(73) Assignee: Upstart Power, Inc., Southborough, MA (US)

( * ) Notice: Subject to any disclaimer, the term of this patent is extended or adjusted under 35 U.S.C. 154(b) by 0 days.

(21) Appl. No.: 16/553,868

(22) Filed: Aug. 28, 2019

(65) Prior Publication Data

US 2019/0393521 A1 Dec. 26, 2019

Related U.S. Application Data

(63) Continuation of application No. 14/399,795, filed as application No. PCT/US2014/059447 on Oct. 7, 2014, now Pat. No. 10,446,858.

(51) Int. Cl.
*H01M 8/04007* (2016.01)
*H01M 8/2484* (2016.01)
*H01M 8/2475* (2016.01)
*H01M 8/124* (2016.01)

(52) U.S. Cl.
CPC ..... *H01M 8/04067* (2013.01); *H01M 8/2475* (2013.01); *H01M 8/2484* (2016.02); *H01M 2008/1293* (2013.01)

(58) Field of Classification Search
CPC .............. H01M 8/04067; H01M 2008/1293
See application file for complete search history.

(56) References Cited

U.S. PATENT DOCUMENTS

| | | | |
|---|---|---|---|
| 3,224,187 A | 12/1965 | Breihan | |
| 4,910,100 A | 3/1990 | Nakanishi et al. | |
| 4,997,726 A | 3/1991 | Akiyama et al. | |
| 6,221,522 B1 | 4/2001 | Zafred et al. | |
| 6,485,852 B1 | 11/2002 | Miller et al. | |
| 6,492,050 B1 | 12/2002 | Sammes | |
| 6,608,463 B1 | 8/2003 | Kelly et al. | |
| 6,627,339 B2 | 9/2003 | Haltiner, Jr. | |
| 6,824,907 B2 | 11/2004 | Sarkar et al. | |

(Continued)

FOREIGN PATENT DOCUMENTS

| | | |
|---|---|---|
| EP | 1202366 | 5/2002 |
| JP | 2011129280 | 6/2011 |

(Continued)

OTHER PUBLICATIONS

International Search Report and Written Opinion for PCT International Application No. PCT/US2014/059447 dated Jun. 30, 2015, 14 pages.

(Continued)

*Primary Examiner* — Osei K Amponsah
(74) *Attorney, Agent, or Firm* — Burns & Levinson, LLP; George N. Chaclas

(57) ABSTRACT

A solid oxide fuel cell (SOFC) system included high thermal conductivity such as copper materials such as copper to increase thermal energy transfer by thermal conduction. The copper is protected from oxidation by nickel electroplating and protected from thermal damage by providing Hastelloy liners inside combustion chambers. Monel elements are used in the incoming air conduits to prevent cathode poisoning

14 Claims, 7 Drawing Sheets

(56) References Cited

U.S. PATENT DOCUMENTS

| | | |
|---|---|---|
| 7,001,682 B2 | 2/2006 | Haltiner, Jr. |
| 7,226,681 B2 | 6/2007 | Florence et al. |
| 7,235,321 B2 | 6/2007 | Sarkar et al. |
| 7,249,884 B2 | 7/2007 | Torii et al. |
| 7,256,516 B2 | 8/2007 | Buchanan et al. |
| 7,422,810 B2 | 9/2008 | Venkataraman et al. |
| 7,452,622 B2 | 11/2008 | Sarkar et al. |
| 7,655,337 B2 | 2/2010 | Kaye |
| 7,674,543 B2 | 3/2010 | Chiang et al. |
| 7,897,292 B2 | 3/2011 | Schaevitz et al. |
| 7,943,263 B2 | 5/2011 | Brantley et al. |
| 8,304,122 B2 | 11/2012 | Poshusta et al. |
| 8,530,114 B2 | 9/2013 | Kirkwood |
| 8,614,023 B2 | 12/2013 | Poshusta et al. |
| 8,854,389 B2 | 10/2014 | Wong et al. |
| 8,890,474 B2 | 11/2014 | Kim et al. |
| 9,056,768 B2 | 6/2015 | Langan |
| 9,065,159 B2 | 6/2015 | Chan et al. |
| 9,190,673 B2 | 11/2015 | Venkataraman et al. |
| 9,343,758 B2 | 5/2016 | Poshusta et al. |
| 9,452,475 B2 | 9/2016 | Armstrong et al. |
| 9,722,435 B2 | 8/2017 | Park |
| 9,831,043 B2 | 11/2017 | Roumi et al. |
| 2003/0054215 A1 | 3/2003 | Doshi et al. |
| 2004/0081872 A1 | 4/2004 | Herman et al. |
| 2005/0269234 A1 | 12/2005 | Gore et al. |
| 2006/0127725 A9 | 6/2006 | Sarkar et al. |
| 2007/0141424 A1 | 6/2007 | Armstrong et al. |
| 2010/0001689 A1 | 1/2010 | Hultman et al. |

FOREIGN PATENT DOCUMENTS

| | | |
|---|---|---|
| WO | 2007/076440 | 7/2007 |
| WO | 2011113280 | 9/2011 |
| WO | 2013/088122 | 6/2013 |

OTHER PUBLICATIONS

Singapore Search and Examination Report dated Nov. 20, 2017 for Singapore Patent Application No. 11201702330X, 6 pages.
European Search Report for European Patent Application No. 14903601.4, dated Oct. 23, 2018, 9 pages.
ENrG Incorporated, HEXIM—Improved Thermal Management of SOFC, MCFC, PEM, and HTPEM Fuel Cell and Reformer Systems, Apr. 6, 2014, 1 page.
K. Burke et al., "Development of Passive Fuel Cell Thermal Management Materials", May 12, 2009, 13 pages.

FUEL FLOW DIAGRAM

AIR FLOW DIAGRAM

Detail of wall
2075

Detail of wall
2175

Detail of wall
2170

SOFC-CONDUCTION

CROSS-REFERENCE TO RELATED APPLICATIONS

This application is a continuation of U.S. Serial No. 14/399,795 filed Nov. 7, 2014, which is a National Stage Entry of International Application No. PCT/US2014/059447 filed on Oct. 7, 2014, each of which are incorporated by reference as though fully set forth herein.

1 COPYRIGHT NOTICE

A portion of the disclosure of this patent document may contain material that is subject, to copyright protection. The copyright owner has no objection to the facsimile reproduction by anyone of the patent document, or the patent disclosure, as it appears in the Patent and Trademark Office patent tiles or records, but otherwise reserves all copyright rights whatsoever. The following notice shall apply to this document: © 2014 Protonex Technology Corporation.

2 BACKGROUND OF THE INVENTION

2.1 Field of the invention

The exemplary, illustrative, technology herein relates to Solid Oxide Fuel Cell (SOFC) systems, methods of use, and methods of manufacturing SOFC systems. In particular, the exemplary, illustrative technology relates to improved systems and methods for thermal energy management within the SOFC system.

2.2 The Related Art

A conventional SOFC system includes a hot zone, which contains or at least partially encloses system components that are maintained at higher operating temperatures, e.g. above 350 or 500® C., during operation, depending on the SOFC technology. The hot zone houses an SOFC energy generator or solid oxide fuel cell stack. Conventional SOFC fuel cell stacks are formed by one or more fuel cells with each cell participating in an electro-chemical reaction that generates an electrical current. The fuel cells are electrically interconnected in series or in parallel as needed to provide a desired output voltage of the cell stack. Each fuel cell includes three primary layers, an anode layer or fuel electrode, a cathode layer or air electrode and an electrolyte layer (hat separates the anode layer from the cathode layer.

The anode layer is exposed to a gaseous or vaporous fuel that at least contains hydrogen gas ($H_2$) and/or carbon monoxide (CO). At the same time the cathode layer is exposed to a cathode gas such as air or any other gas or vaporous oxygen ($O_2$) source. In the cathode layer oxygen (air) supplied to the cathode layer receives electrons to become oxygen ions ($O^+$). The oxygen ions pass from the cathode layer to the anode layer through the ceramic electrolyte layer. At the triple phase boundary, in the anode layer, hydrogen ($H_2$) and/or carbon monoxide (CO) supplied to the anode layer by the fuel react with oxide ions to produce water and carbon dioxide and electrons emitted during this reaction produce electricity and heat. Other reaction by products in the fuel stream may include methane, ethane or ethylene. The electricity produced by the electro-chemical reaction is extracted to DC power terminals to power an electrical load. Common anode materials include cermets such as nickel and doped zirconia (Ni-YSZ), nickel and doped ceria (Ni-SDC and or Ni-GDC), copper and doped ceria. Perovskite anode materials such as (La1-xSrx)Cr1-yMyO3-δ (LSCM) and other $ABO_3$ structures are also usable. Common cathode materials include Lanthanum Strontium Cobalt Oxide (LSC), Lanthanum Strontium Cobalt Iron Oxide LSCF and Lanthanum Strontium Manganite (LSM). The electrolyte layer is an ion conducting ceramic, usually an oxygen ion conductor such as yttria doped zirconia or gadolinium doped ceria. Alterably the electrolyte layer is a proton conducting ceramic such as barium cerates or barium neonates. The electrolyte layer acts as a near hermetic barrier to prevent the fuel and air from mixing and combusting.

Conventional SO PC systems use cross How or parallel flow heat exchangers, commonly referred to as recuperators, to heat cathode gasses (air) entering the SOFC system. The gas flow heat exchangers heat cool air entering the hot zone exchanging thermal energy between the cool entering air and hot exhaust gas exiting the hot zone.

It is known in include one or more thermal energy or heat sources disposed inside the SOFC hot zone to heat (he air and fuel flowing through the SOFC system and lo heat the fuel cells. The heat source may include a tail gas combustor used to combust spent fuel mixed with hot exhaust air as the spent fuel and exhaust air exit the cell slack. A second heat source may include a cold start combustor operable to combust fuel at system startup to heat the SOFC surfaces and to heat incoming fuel flowing to the cell stack at least until the SOFC systems reaches it steady state operating temperature or the CPOX or TGC lights off. Electrical heating elements are also usable instead of or in addition to a cold start combustor to heat air, fuel, and operating surfaces at startup.

In conventional SOFC systems thermal energy is primarily transferred by gas to gas or gas to surrounding surface thermal energy exchange, i.e. primarily by convection. This occurs in the tail gas combustor when spent fuel is mixed with hot exhaust air and combusted inside a combustion enclosure. In this case thermal energy is exchanged by convection as cooler gasses enter the combustion enclosure mix with hotter gases and combust. Additionally convective thermal energy transfer also heats the combustion enclosure surfaces as gas passes thermal energy to the enclosure surfaces. Meanwhile the hot enclosure walls transfer thermal energy back to cooler gases entering the combustion chamber when hot surfaces emit thermal energy and gases flowing proximate to the hot surfaces are heated by the emitted radiation.

In conventional SOFC systems, a recuperator or gas counter flow heat exchanger, is disposed to receive hot gases exiting from the combustion chamber and to receive cool gases entering into the SOFC system in separate counter flow conduits separated by a common wall. Again convection and radiation are the dominant thermal energy transfer mechanisms as hot gases from the combustor heat conduit walls as they pass to an exit port and the conduit walls heat incoming air. In short the thermal energy exchange both inside the tail gas combustor and inside the recuperator is not efficient. The result is that conventional SOFC systems are notoriously difficult to control and often develop hot spots, e.g. in the combustion enclosures, that can damage the enclosure walls even burning through walls when a combustion enclosure wall gets too hot. Alternately when the temperature of the SOFC system is lowered, e.g. by modulating a fuel input flow rate, incomplete fuel processing results in carbon formation on anode surfaces which ultimately leads to decreased electrical output and eventual failure.

To better address hot and cold spots conventional SOFC systems often include a plurality of thermocouples or thermistors disposed at various system points to monitor temperature and adjust operation in order to avoid hot spots and prevent cold spots which lead to carbon formation on anode surfaces. However the temperature sensing and monitoring systems are costly and prone to failure due to the high operating temperatures of the SOFC systems (e.g. 350-1200° C.). Moreover the need to modulate fuel input us a safety measure to avoid damaging the SOFC system leads to inefficient und variable electrical power output. Thus there is a need in the art to avoid thermal gradients and eliminate hot spots in order to avoid damaging the SOFC system and in order to deliver more consistent electrical power output with improve power generation efficiency.

Conventional SOFC systems are generally fabricated from specialty materials in order to survive the effects of extended operation at high temperatures and the severely corrosive environment which continuously oxidizes metal surfaces sometimes to the point of failure. Other high temperature problems that have been addressed in conventional SOFC systems include the need to match or account for differences in the thermal coefficient of expansion of mating parts of dissimilar materials in order to avoid loosening between mating parts, cracking of ceramic elements or bending of metal elements, and the need to account for increased metal creep rates that occur at high temperature. In conventional SOFC systems these problems have been addressed by using specialty high temperature corrosion resistant nickel-chromium alloys such as Inconel or the like. However chromium leached into incoming cathode air can poison the cathode material layer, so materials that contain chromium are not desirable along any of the incoming air conduits or heaters if cathode poisoning is to be avoided. Thus while there is a need in the art to use corrosion or oxidation resistant high temperature metals alloys to fabricate SOFC hot zone elements many of these alloys contain chromium and there is a further need in the art to avoid contacting cathode air with chromium containing surfaces.

While some thermal energy is transferred between regions of conventional SOFC systems by thermal conduction, e.g. conducted across interconnected metal elements, the fact that hot and cold spots are still problematic in conventional SOFC systems suggests that thermal conduction is either too slow or insufficient to promote a uniform temperature across different regions of a conventional SOFC system. This is due in part to the need to use specialty metals for the high temperature corrosive environment which have less than desirable thermal conductivity properties. As an example, Inconel has a thermal conductivity ranging from 17-35 W/(m° K) over a temperature range of 150 to 875° C. as compared to copper which has a thermal conductivity approximately ranging from 370 W/(m° K) at 500° C. and 332 W/m° K at 1027° C. Thus copper has a thermal conductivity that is more than 10 times the thermal conductivity of Inconel, which is about 70% nickel. While copper provides increased thermal conductivity over high temperature metal alloys, mostly comprising nickel, which could improve temperature uniformity in SOFC systems, copper is readily oxidized in the SOFC environment and has thus far been avoided as an SOFC housing material.

3 Objects of the Invention

In view of the problems associated with conventional methods and apparatus set forth above, it is an object of the present invention to provide a SOFC system in which increased thermal energy transfer by thermal conduction is used lo transfer thermal energy from one area of a SOFC hot zone to another in order to reduce thermal gradients across the hot zone.

It is a further object of the invention lo provide interconnected thermal energy conduction pathways that extend across a plurality of different mechanical elements that are mechanically interfaced with each other in order to reduce thermal gradients across the SOFC system.

It is a still further object of the present invention to manage thermal energy exchange between different regions of a SOFC system hot zone by providing high thermal conductivity thermal mass elements in thermal communication with enclosure walls and with heat sources and heat exchangers to substantially stabilize the temperature of each region of the SOFC hot zone.

4 BRIEF SUMMARY OF THE INVENTION

The present invention overcomes the problems associated with conventional SOFC systems by providing an improved SOFC system. The improved Solid Oxide Fuel Cell (SOFC) system of the present invention includes hot zone enclosure walls disposed to enclose a hot zone cavity. The hot zone enclosure walls are fabricated from one or more materials having a thermal conductivity of greater than 100 W/(m° K) at temperatures above 350° C. and preferably with a thermal conductivity of greater than 300 W/(m° K). Ideally the hot zone enclosure walls are fabricated from copper. The copper is protected from oxidation by forming a surface coating over exposed surfaces of the enclosure walls to prevent the enclosure walls from exposure to hydrocarbon fuels and or air. In one example embodiment the surface coating is nickel plating applied by an electro-plating process to a thickness of at least 0.0005 inches but ranging up to 0.0015 inches and even higher to about 0.002 inches in some applications in order to prevent oxygen diffusion through the plating material at operating temperatures of 350 to 1200° C. In practice, the plating thickness is dependent upon the desired operating life in hours, the average and/or peak operating temperatures and the oxidants used, e.g. in the fuel or the cathode gas.

At least one thermal mass element is disposed inside the hot zone cavity supported by or attached to the hot zone enclosure walls. Specifically the thermal mass element is in thermally conductive communication with the hot zone enclosure walls. The thermal mass element is fabricated from one or more materials having a thermal conductivity of greater than 100 W/(m° K) at temperatures above 350° C. and preferably with a thermal conductivity of greater than 300 W/(m° K). Ideally the thermal mass clement is fabricated from copper. The copper is protected from oxidation by forming a surface coating over exposed surfaces of the thermal mass element to prevent the thermal mass element from being exposed to hydrocarbon fuels and or air or oxygen. Ideally the surface coating is nickel plating applied by an electro-plating process to a thickness of at least 0.0005 inches and ranging up to 0.002 inches in order to prevent oxygen diffusion through the plating material at operating temperatures of 350 to 1200° C. The enclosure walls and the thermal mass may also be fabricated from one or more of molybdenum, aluminum copper, copper nickel alloys or a combination thereof.

A tail gas combustor region is disposed inside the hot zone cavity for combusting a mixture of spent fuel and hot exhaust air exiting from the SOFC stack. Alternately the tail gas combustor region may be disposed outside the hot zone cavity e.g. surrounding the hot zone enclosure walls. The combustion region is at least partially bounded by the hot zone enclosure walls such that thermal energy received by the hot zone enclosure walls from combustion is then thermally conducted through the hot zone walls to other regions of the hot zone enclosure walls to reduce thermal gradients across the hot zone enclosure wall structure. The tail gas combustor region is lined by internal walls formed from a high temperature, corrosion resistant metal such as Hastelloy and or Inconel or ceramic coated steel. More general the liner material is a metal alloy having as its primarily component metal nickel. The liner or liners may be soldered in place in a manner that prevents gasses inside the tail gas combustor from oxidizing or otherwise damaging surfaces of the hot zone cavity and or surfaces of any thermal mass elements bounding the hot zone cavity.

A recuperator chamber is disposed inside the hot zone cavity for receiving cool air entering the hot zone cavity and heating the cool air before it is delivered to the SOFC stack. Alternately the recuperator chamber may be disposed outside the hot zone cavity e.g. surrounding the hot zone enclosure walls or surrounding the combustor region. The recuperator chamber is at least partially bounded by the hot zone enclosure walls which radiate thermal energy into the recuperator chamber to heat incoming air. Alternately or additionally the recuperator chamber is at least partially bounded by walls of the combustor region. Preferably a thermal mass element forms a portion of a tail gas combustor region end wall that is also a recuperator chamber end wall such that a wall including the thermal mass element separates the tail gas combustor region from the recuperator chamber. Combustion byproducts exiting the tail gas combustion region flow over external surfaces of the recuperator chamber to further heat the hot zone enclosure walls surrounding the recuperator chamber.

A fuel reformer may be disposed at least partially inside the hot zone enclosure for catalyzing or otherwise reforming a fuel supply entering the fuel delivery system.

A cold start combustion chamber may be enclosed by the hot zone enclosure walls for combusting fuel during a cold start of the SOFC system. The cold start combustion chamber is at least partially enclosed by the hot zone enclosure walls. Internal walls of the cold start combustion chamber are preferably lined with a high temperature, corrosion resistant metal such as Hastelloy and or Inconel or a ceramic coated metal or fabricated from ceramic insulation.

A SOFC fuel cell stack is disposed inside the hot zone cavity. The fuel cell stack at least includes one electro-chemical fuel cell and preferably includes a plurality of fuels cells. Each fuel cell includes an anode support layer, ceramic electrolyte applied over the anode support layer and a cathode layer formed over the ceramic electrolyte layer. The anode support layer is exposure to a hydrocarbon fuel while the cathode layer is exposed to a cathode gas comprising oxygen. The anode support layer may be formed as a flat plate or as a tube shaped conduit.

5 BRIEF DESCRIPTION OF THE DRAWINGS

The features of the present invention will best be understood from a detailed description of the invention and example embodiments thereof selected for the purposes of illustration and shown in the accompanying drawings in which.

5.1 DEFINITIONS

Figure 1:
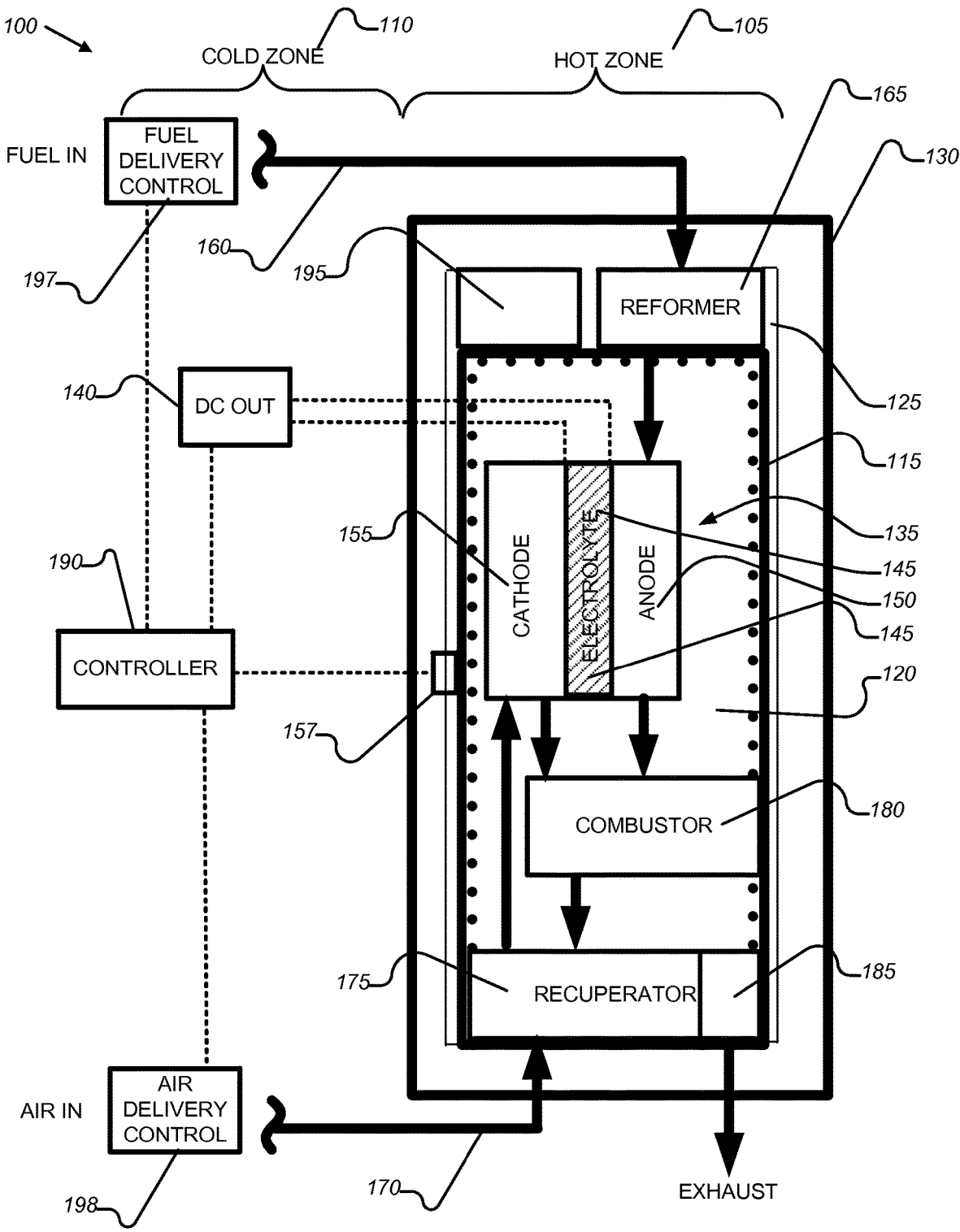
FIG. 1 depicts a schematic view of a first exemplary SOFC system according to the present invention.

The following definitions are used throughout, unless specifically indicated otherwise:

| TERM | DEFINITION |
|---|---|
| Hastelloy | A group of alloys comprising predominantly metal nickel plus molybdenum, chromium, cobalt, iron, copper, manganese titanium, zirconium, aluminum and tungsten in varying percentages including zero in some alloys. Hastelloy alloys are primarily used for effective survival under high temperature and or high stress in moderate to severely corrosive environments. Available from Haynes International Inc. of Kokomo IN, USA. |
| Monet | A group of alloys comprising up to 67% metal nickel and about 30% copper with smaller amounts of iron, manganese, carbon and silicon. Monel is used for its resistance to corrosion. Available from Special Metals Corp. of New Hartford NY, USA. |
| SOFC | Solid Oxide Fuel Cell |
| Inconel | A family of austenitic nickel-chromium alloys comprising nickel 40-70% chromium 14-30%, iron 3-9% manganese 0.3-1% plus silicon, carbon, sulfur and other elements used for its resistance to oxidation and corrosion and strength over a wide range of temperatures. When heated, Inconel forms a thick stable passivating oxide layer protecting the surface from further attack. Attractive for high temperature applications to reduce creep. Available from Special Metals Corp. of New Hartford NY, USA |
| Cermet | Any of a class of heat-resistant materials made of ceramic and sintered metal. Often formed and sintered as a ceramic oxide mixture and converted through the reduction from an oxide ceramic to the metallic phase. (NiO-YSZ → Ni-YSZ) |
| Perovskite | A ternary material with the general structure $A^{[12]}B^{[16]}X_3^{[6]}$ same type of crystal structure as calcium titanium oxide ($CaTiO_3$). |

Item Number List

The following item numbers are used throughout, unless specifically indicated otherwise.

| ITEM NUMBER | DESCRIPTION |
| --- | --- |
| 100 | SOFC system |
| 105 | Hot zone |
| 110 | Cold zone |
| 115 | Enclosure walls |
| 120 | Hot zone cavity |
| 125 | Air gap |
| 130 | Thermal insulation |
| 135 | SOFC fuel cell stack |
| 140 | DC current output terminals |
| 145 | Electrolyte support |
| 150 | Anode surface |
| 155 | Cathode surface |
| 157 | Thermocouple/temperature sensor |
| 160 | Fuel input line |
| 165 | Fuel reformer |
| 170 | Air input line |
| 175 | Recuperator |
| 180 | Combustor |
| 185 | Exhaust port |
| 190 | Electronic controller |
| 195 | Cold start module |
| 197 | Fuel delivery controller |
| 198 | Air delivery controller |
| 2000 | Hot zone |
| 2002 | Hot zone enclosure side wall |
| 2004 | Disc-shaped top wall |
| 2005 | SOFC fuel cell stack |
| 2006 | Disc-shaped bottom wall |
| 2010 | Hot zone cavity |
| 2012 | Thermal insulation layer |
| 2015 | Hot zone enclosure walls |
| 2020 | Reformer |
| 2025 | Fuel air mixture |
| 2030 | Reformer enclosure walls |
| 2035 | Catalyzing cavity |
| 2040 | Catalyzing medium |
| 2045 | Reformer input port |
| 2050 | Reformer exit port |
| 2055 | Fuel input manifold |
| 2060 | Longitudinal axis |
| 2065 | Annular thermal insulating element |
| 2070 | Top tube support wall |
| 2075 | Bottom tube support wall |
| 2080 | Fuel cells |
| 2085 | Annular tube wall |
| 2090 | Cathode chamber |
| 2095 | Top end cap |
| 2100 | Bottom end cap |
| 2105 | Attaching end |
| 2110 | Supporting end |
| 2115 | Cell input port |
| 2120 | Cell output port |
| 2125 | Electrical Lead |
| 2130 | Electrical lead |
| 2135 | Tail gas combustor |
| 2140 | Combustor end wall |
| 2145 | Cathode feed tube |
| 2150 | Exit port combustor |
| 2155 | Air gap |
| 2160 | Thermally conductive mass |
| 2165 | Hot zone exit port |
| 2170 | Fuel input manifold top wall |
| 2175 | Thermally conductive mass |
| 2180 | Thermally conductive mass |
| 2185 | Combustor baffle |
| 2200 | Incoming air |
| 2205 | Air input port |
| 2210 | Recuperator chamber |
| 2215 | Recuperator baffle |
| 2220 | Exhaust out |
| 2225 | Air input port |
| 2230 | Recuperator air input port |
| 2235 | Recuperator air output port |
| 2240 | Cathode chamber air input port |
| 2245 | Cathode chamber air output port |
| 2300 | Cold start combustor |
| 2305 | Annular combustor cavity |
| 2310 | Combustor inlet port |

-continued

| ITEM NUMBER | DESCRIPTION |
| --- | --- |
| 2315 | Fuel |
| 2320 | Igniter |
| 2325 | Startup combustor exit port |
| 5005 | Section of wall 2002 |
| 5010 | Copper core |
| 5015 | Nickel layer |
| 5020 | Nickel layer |
| 5025 | Sidewall recuperator chamber |
| 5030 | Hastelloy liner element |
| 5035 | (doesn't exist) |
| 5040 | Section of bottom tube wall |
| 5045 | Monel liner element |
| 5050 | Hastelloy liner element |
| 5055 | Section of wall 2175 |
| 5060 | Hastelloy liner element |
| 5065 | Monel liner element |
| 7000 | SOFC system |
| 7010 | Cathode chamber |
| 7015 | Hot zone enclosure wall |
| 7020 | Insulation layer |
| 7025 | Cathode feed tube |
| 7030 | Center axes |
| 7035 | Inner circular pattern |
| 7040 | Inner rod shaped fuel cells |
| 7045 | Outer circular pattern |
| 7050 | Outer rod shaped fuel cells |

5.2 DETAILED DESCRIPTION OF THE INVENTION

Referring to FIG. 1, a schematic diagram of a first embodiment of the present invention depicts a Solid Oxide Fuel Cell (SOFC) system (100). The system (100) includes a hot zone (105), that includes at least one SOFC fuel cell and preferably a plurality of fuel cells forming a fuel cell slack maintained at a high operating temperature, and a cold zone (110) that includes fuel input and exhaust modules, a DC power output module and other control elements. Hot zone enclosure walls (115) are disposed to enclose a hot zone cavity (120) therein. A thermal insulation layer (130) surrounds the enclosure walls (115) to thermally insulate the hot zone (105). An air gap (125) is provided between the insulation layer (130) and a side wall of the hot zone enclosure walls (115) and the air gap provides a gas flow conduit for gases to flow from different regions of the hot zone to an exhaust port (185).

According to an important aspect of the present invention, the hot zone enclosure walls (115) und associated thermal energy management elements described below are in thermal communication with each other in order to provide thermally conductive pathways for thermal energy transfer to all regions of the hot zone by thermal conduction through the hot zone enclosure walls (115). More specifically the hot zone enclosure walls (115) and any thermal energy management elements, described below, comprise materials having a high coefficient of thermal conductivity, e.g. between 100 and 300 W/(m° K), and preferably above 200 W/(m° K) at temperatures ranging from 350 to 1200° C. Accordingly, the external walls and other thermal energy management elements, described below, are fabricated from one or more of copper, molybdenum, aluminum copper, copper nickel alloys or a combination thereof. Specifically the hot zone enclosure walls (115) and associated thermal energy management elements are configured to provide thermally conducive pathways for rapid conduction of thermal energy from one area of the hot zone to another More specifically the hot zone enclosure walls (115) and associated thermal energy management elements are configured to manage thermal energy within the hot zone by rapidly conducting thermal energy from high temperature areas of the hot zone in lower temperature areas of the hot zone in order to ensure that the entire hot zone is maintained at a substantially uniform temperature.

An electrochemical energy generator or fuel cell stack (135) comprising one or more Solid Oxide Fuel Cells or fuel cell is enclosed within the hot zone (105) and supported with respect to the enclosure walls (115) by one or more support elements, described below. The fuel cell slack (135) includes one or more fuel cells with each cell participating in an electro-chemical reaction that generates an electrical current. The fuel cells are electrically interconnected in series or in parallel as needed to provide a desired output voltage of the cell stack (135). Each fuel cell includes three primary layers, an anode layer or fuel electrode (150), a cathode layer or air electrode (155) and an electrolyte layer (145) that separates the anode layer from the cathode layer.

The anode layer (150) is exposed to a gaseous or vaporous fuel that at least contains hydrogen gas ($H_2$) and/or carbon monoxide (CO). At the same time the cathode layer (155) is exposed to air or any other gas or vaporous oxygen ($O_2$) source. In the cathode layer (155) oxygen (air) supplied to the cathode layer receives electrons to become oxygen ions ($O^{2-}$). The cathode reaction is $\frac{1}{2}O_2+2e^-=O^{2-}$, sometimes written as O".

The oxygen ions pass from the cathode layer to the anode layer (150) through the ceramic electrolyte layer (145). In the anode layer hydrogen ($H_2$) and/or carbon monoxide (CO) supplied to the anode layer by the fuel read with oxide ions to produce water and carbon dioxide and electrons emitted during this reaction produce electricity and heat. Other reaction by products may include methane, ethane or ethylene. The electricity produced by the electro-chemical reaction is extracted to DC power terminals (140) to power an electrical load.

Common amide materials include cermets such as nickel and doped zirconia, nickel and doped ceria, copper and ceria. Perovskite anode materials such as $Sr_2Mg_{1-x}MnxMoO_{6-\delta}$ or $La_{0.75}Sr_{0.25}Cr_{0.5}Mn_{0.5}O_{3-\delta}$ are also usable. Common cathode materials include Lanthunum Strontium Cobalt Oxide (LSC), Lanthanum Strontium Cobalt Iron Oxide LSCF and Lanthanum Strontium Manganite (LSM). The electrolyte layer is an ion conducting ceramic, usually an oxygen ion conductor such as yttria doped zirconia or gadolinium doped ceria. Alterably the electrolyte layer is a proton conducting ceramic such as barium cerates or barium ziconates. The electrolyte layer acts as a near hermetic barrier to prevent the fuel and air from mixing and combusting.

Generally each fuel cell is configured with one of the anode layer (150), the cathode layer (155) or the electrolyte layer (145) formed as a support or mechanically structural element and the other two layers are coated onto the support element e.g. by dipping, spraying or the like. Various support element structures are usable including one non-limiting example embodiment shown in FIG. 2 wherein each fuel cell comprises an anode support element configured as a hollow tube forming a cylindrical gas conduit wherein the anode layer (150) forms the inside diameter of the cylindrical conduit, the ceramic electrolyte layer (145) is coated over the outside diameter of the structural anode layer (150) and the cathode layer (155) is coated over the outside diameter of the electrolyte layer (145).

A hydrocarbon fuel at least comprising hydrogen ($H_2$) and carbon monoxide (CO) flows through the hollow ceramic tube in contact with the anode layer and air flows over and outside surface of the hollow tube in contact with the cathode layer. Electrical current is generated as described above.

Figure 2:
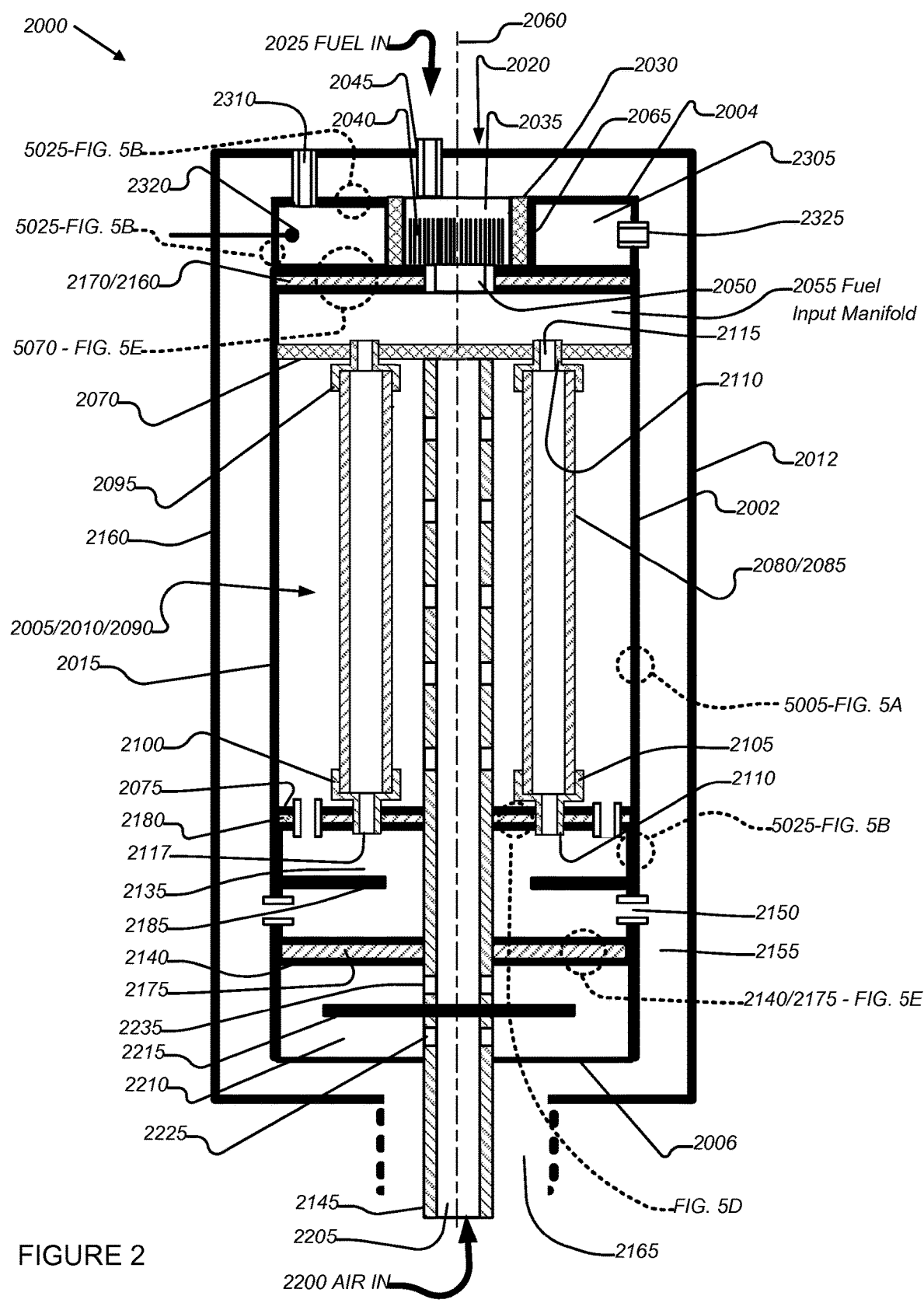
FIG. 2 depicts a schematic view of an exemplary hot zone or a SOFC system according to the present invention.

While the specific cell stack of FIG. 2 comprises a plurality of tubular fuel cells, other cell stacks formed by fuel cells having different known form factors are usable without deviating from the present invention. These may include a cell stack (135) formed from a plurality of flat sheet type fuel cells formed in a slack with each cells including a sheet shaped support layer with the other layers coated onto the support layer and a separator disposed between adjacent flat support layer with other layers coaled onto the support layer.

A fuel input line (160) delivers gaseous or vaporous hydrocarbon fuel from a fuel container stored in the cold zone (110) or from an external supply delivered into the cold zone (110). A Fuel delivery controller (197) in communication with un electronic controller (190) is disposed along the fuel input line (160) in the cold zone to regulate fuel input volume or mass flow rate as needed to control the fuel input rate. The fuel input line (160) delivers fuel into a fuel reformer (165) for fuel processing which basically extracts pure hydrogen from the fuel. The reformed fuel is passed over the anode surface (150) for electro-chemical reaction therewith. The hydrocarbon fuel may comprise various fuel components and mixtures but at least includes hydrogen ($H_2$) and/or carbon monoxide (CO).

An air ore cathode gas input line (170) delivers gaseous or vaporous oxygen such as mom air or another oxygen source into the cold zone (110) e.g. through an intake fan or the like. An air delivery controller (198) in communication with the electronic controller (190) is optionally disposed along the air input line (170) in the cold zone to regulate air input volume or mass flow rate as needed to control the air input rate. The air input line (170) delivers room temperature air into a recuperator (175) which heats the input air by a thermal energy exchange between fuel and air exiting the hot zone and the incoming cooler air. The heated incoming air is passed over the cathode surface (155) for chemical reaction therewith.

Both the spent fuel and oxygen diminished air exit the cell stack (135) and mix in a combustion region or tail gas combustor (180). The mixture of unreacted fuel and unreacted air plus reaction byproducts delivered into the tail gas combustor (180) spontaneously combusts therein locally generating thermal energy. The combustor walls, detailed below, comprise materials having a high coefficient of thermal conductivity, e.g. between 100 and 300 W/(m° K). and preferably above 200 W/(m° K). Additionally the combustor walls are in thermal communication with the hot zone enclosure walls (115) such that thermal energy generated by combustion inside the combustor (180) heats the combustor walls to a high temperature which quickly initiates thermal energy transfer to all regions of the hot zone by conductive thermal energy transfer through the hot zone enclosure walls (115).

Combustion byproduct exiting form the tail gas combustor (180) comprising hot gas is delivered into the recuperator (175). The recuperator comprises a cross flow heat exchanger with counter flow conduits provided to transfer thermal energy from the combustion hot byproduct to cooler incoming air to thereby heat the incoming air before it enters the SOFC fuel cell stack (135). After passing through the recuperator (175) the combustion byproduct is exhausted through an exhaust port (185).

A thermocouple or other temperature sensor (157) is affixed to a surface of the enclosure walls (115) to sense a temperature thereof and the temperature information is communicated to the electronic controller (190). The controller (190) is in communication with other electronic elements such as one or more electrically operable gas flow valves, gas flow rule detectors and or modulators, associated with the fuel delivery controller (197), the air delivery controller (198) and electrical power output detectors, or the like, and other elements as may be required to control various operating parameters of the SOFC (100). The electronic controller (190) monitors DC current output as well as temperature measured at the thermocouple and further operates to vary the fuel input and air rates as a means of increasing or decreasing DC current output.

Additionally an optional cold start preheater (195) may be provided to preheat input fuel at start up. The preheater (195) may be a fuel igniter usable to ignite a portion of the fuel supply for preheating the enclosure walls and ceramic electrolyte structures or the cold sun preheater (195) may comprise an electrical heater usable to preheat input fuel, or both.

5.3 Exemplary Hot Zone Architecture

Turning now to FIG. 2 a first non-limiting exemplary embodiment of an improved SOFC system hot zone (2000) according to the present invention includes a SOFC fuel cell stack (2005) comprising a plurality of individual fuel cells enclosed within a hot zone cavity (2010). The hot zone cavity (2010) is surrounded by enclosure walls (2015) wherein the enclosure walls ore formed from one or more of copper, molybdenum, aluminum copper, copper nickel alloys or u combination thereof. The enclosure walls are surrounded by a thermal insulation layer (2012) which prevents thermal energy from exiting the hot zone. An air gap (2115) is disposed between the hot zone enclosure walls (2013) and the thermal insulation layer (2012). The air gap (2155) provides a fluid flow conduit that leads to a hot zone exit port (2165) and is used to carry exhaust gases out of the hot zone.

The enclosure walls (2015) are configured to provide thermally conducing pathways comprising materials having a coefficient of thermal conductivity, of between 100 and 300 W/(m° K) and preferably more 200 W/(m° K). Moreover the thermally conducing pathways are disposed to act as thermal energy conduits suitable for conducting thermal energy from high temperature zones of the hot zone to lower temperature zones of the hot zone in order to more rapidly equalize the temperature of each area of the hot zone.

5.3.1 Reformer

The hot zone cavity (2010) of the present non-limiting exemplary embodiment is a can-shaped cylindrical volume hounded by the hot zone enclosure walls (2015) which include a cylindrical side wall (2002) a disk-shaped top wall (2004) and a disk shaped bottom wall (2006). The hot zone (2000) operates most efficiently at a temperature above 350 or above 500° C. depending upon the SOFC reactions being used and may be operated at temperatures in the range of 350 to 1200° C. Accordingly each of the elements of the hot zone of the present invention is configured to operate reliably at temperatures ranging up to 1200° C.

According to a preferred non-limiting example embodiment of the present invention a fuel reformer (2020) that uses an exothermic reaction to reform fuel is provided inside or partially inside the hot zone to reform the input fuel for delivery into each of the fuel cells of the fuel cell slack (2005). The reformer (2020) of the present exemplary embodiment comprises a Catalytic Partial Oxidation (CPOX) reactor which partially combusts a fuel air mixture (2025) delivered thereto. The fuel reforming process creates a hydrogen rich fuel or syngas comprising hydrogen, carbon monoxide water, carbon dioxide and other small hydrocarbons such as methane. The CPOX reactor includes a catalyst such as a metallic or oxide phase or rhodium (Rh) or other suitable catalyzers (e.g. Pt, Pd, Cu, Ni, Ru and Ce) coated on internal surfaces (2040) thereof. The fuel air mixture (2025) passing through the CPOX reactor is catalyzed as it passes over the catalyst coaled surfaces (2040) and the heat released by the reaction is radiated und thermally conducted to the hot zone enclosure walls (2015) and helps to heat the fuel cell stack.

The CPOX reformer (2020) comprises reformer enclosure walls (2030) surrounding a cylindrical catalyzing cavity (2035). The cylindrical catalyzing cavity (2035) supports a catalyzing medium (2040) therein. In the present example embodiment, the catalyzing medium is a square cell extruded monolith (2040) with exposed surfaces thereof coated with a suitable catalyst. The monolith is positioned such that the incoming fuel air mixture (2025) flows past the exposed surfaces of the square cell extruded monolith for catalyzation. Other suitable catalyzing structures may include a plurality of parallel plate or concentric ring structures or a porous metal or ceramic foam structure such as a sintered or extruded element formed with exposed surfaces thereof coated with the catalyzing agent. Alternately, the catalyzing structure may comprise a plurality of mesh screens having exposed surfaces coated with the catalyzing agent. The main fuel air mixture (2025) herein after "fuel" enters the reformer (2020) through a reformer input port (2045) and flows through the catalyzing medium (2040) for catalyzation by contact with the catalyzed surfaces. The catalyzed fuel flows out of the reformer through a reformer exit port (2050) and into a fuel input manifold (2055).

In the present non-limiting exemplary embodiment the reformer enclosure walls (2030) comprises a cylindrical or square wall enclosing a cylindrical or square cross-sectioned catalyzing cavity (2035). The catalyzing medium (2040), is supported inside the catalyzing cavity (2035) disposed to force the incoming fuel (2025) to flow through the catalyzing structure past the catalyzing surfaces. A thermal insulating element (2065) is disposed to surround outside surfaces of the catalyzing cavity (2035). The thermal insulating clement (2065) is provided to substantially prevent thermal energy from entering or exiting the catalyzing cavity (2035). The reformer enclosure walls (2030) may comprise a high temperature steel alloy such as Inconel, comprising nickel chromium and iron, a high temperature copper alloy e.g. Monel, comprising nickel and copper, or other suitable high temperature material.

5.3.2 SOFC Fuel Cell Stack

The SOFC fuel cell slack (2005) is supported inside the can-shaped hot zone enclosure walls (2015). A plurality of rod shaped fuel cells (2080) is supported longitudinally inside a cathode chamber (2090). The cathode chamber (2090) is a can-shaped chamber bounded by the hot zone enclosure cylindrical side wall (2002) and by a pair of opposing disk-shaped top and bottom tube support walls (2070) and (2075). Each tube support wall (2070, 2075) is attached to the cylindrical sidewall (2002) by suitable attaching means such as by welding or brazing, by bracketing and mechanical fastening or held in place without fasteners by a claiming force, by an adhesive bond, or the like. Preferably the cell slack (2005) is assembled prior to installation into the hot zone enclosure walls (2015) and is removable from the hot zone enclosure walls (2015) as a unit, e.g. to repair or inspect the cell stack as needed. Accordingly the top and bottom tube support walls (2070, 2075) may be captured in place between opposing end slops, not shown.

The top tube support wall (2070) mechanically engager with and fixedly supports a top or input end of each of the plurality of rod shaped fuel cells (2080). The mechanical interface between the top support wall (2070) and each of the plurality of fuel cell input ends is a gas tight interface in order to prevent the fuel air mixture (2025) in the fuel input manifold (2055) from entering the cathode chamber (2090). The top tube support wall (2070) is preferably formed with Inconel. Additionally each of the top end caps (2095) is also formed with Inconel, which is an effective material for avoiding creep in high temperature environments. The bottom tube support wall (2075) mechanically engages with and movably supports a bottom or output end of each of the plurality of rod shaped fuel cells (2080). In particular the output end of each fuel cell (2080) is longitudinally movable with respect to the bottom support wall (2075) in order to accommodate changes in the length of each fuel cell as the fuel cells are heated to an operating temperature between 350 and 1200° C. An example tube support system usable with the present invention is disclosed by Palumbo in related U.S. patent application Ser. No. 13/927,418, filed on Jun. 26, 2013 entitled, SOLID OXIDE FUEL CELL WITH FLEXIBLE ROD SUPPORT STRUCTURE.

Figure 5A:
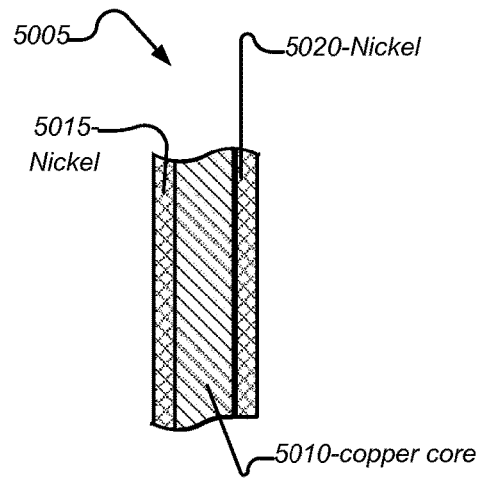
FIG. 5A depicts a section view taken through a first exemplary hot zone external wall of a SOFC system according lo the present invention.
Figure 5B:
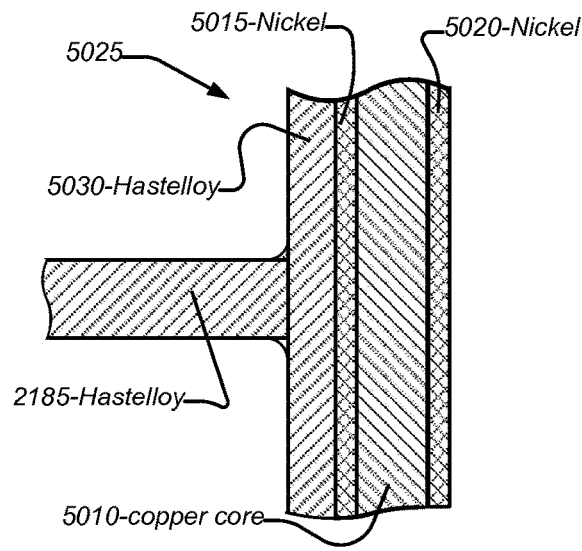
FIG. 5B depicts a section view taken through a second exemplary hot zone external wall of a SOFC system according to the present invention.
Figure 5C:
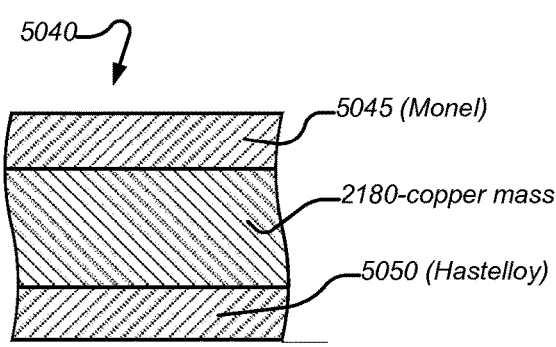
FIG. 5C depicts a section view taken through an exemplary bottom tube support wall including a thermally conducive mass of a SOFC system according to the present invention.
Figure 5D:
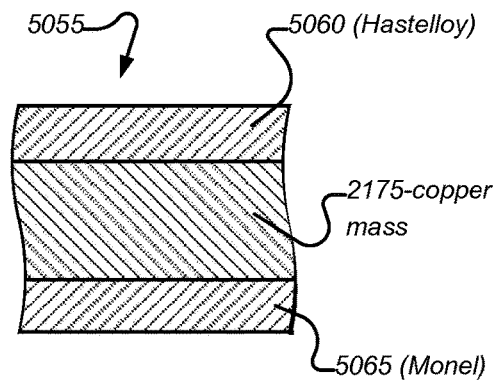
FIG. 5D depicts a section view taken through an exemplary combustion region end wall including a thermally conductive mass of n SOFC system according to the present invention.

Referring now to FIGS. 2 and 5D, the bottom tube support wall (2075) includes a disk shaped thermally conductive mass (2180) comprising one or more materials having a coefficient of thermal conductivity, of more than 100 W/(m° K) and preferably more than 200 W/(m° K) such as one or more of copper, molybdenum, aluminum copper, copper nickel alloys or a combination thereof. The disk shaped thermally conductive mass (2180) is protected by top and bottom protective surface layers (5045) and (5050) described below in relation to FIG. 5D. In one non-limiting exemplary embodiment, each top (5045) and bottom (5050) protective surface layer comprises a separate disk shaped element in thermally conductive contact with the disk shaped thermally conductive mass (2180). Specifically, the top surface layer (5045) facing the cathode chamber (2090) comprises a disk-shaped chromium free high temperature metal alloy such as Monel and the bottom surface layer (5050) that faces a combustion region (2135), or tail gas combustor, comprises a disk-shaped high temperature, corrosion resistant metal such a Hastelloy alloy.

Preferably, each of the top and bottom protective surface layers (5045) and (5050) is in thermally conductive contact with the thermally conductive mass (2180) which is also in thermally conductive contact with the hot zone enclosure cylindrical sidewall (2020). Accordingly as the fuel air mixture is combusted in the tail gas combustor or combustor region (2135) thermal energy generated by combustion is radiated to the walls enclosing the combustion region (2135) and from the enclosing walls is thermally conducted to the thermally conductive mass (2180) and to other regions of the hot zone through the hot zone enclosure walls (2015). In addition thermal energy emitted from the thermally conductive mass (2180) is radiated into the cathode chamber (2090) where it heats the cathode gas, or air flowing there through and heats surfaces of the fuel cells enclosed therein.

Each or the rod shaped fuel cells (2080) comprises a tube shaped annular wall (2085) wherein the anode layer is the support layer. The tube shaped annular wall (2085) is open at both ends. The annular wall (2085) forms a fuel conduit (2085) that extends through the cathode chamber (2090) to carry fuel (2025) there through. Other rod shapes including square, triangular, pentagonal, hexagonal or the like, are usable without deviating from the present invention. Additionally other support layers are usable to provide structural integrity. Each fuel cell includes two metal end caps (2095) and (2100) or tube manifold adaptors with one end cap attached to each of two opposing ends of the tube annular wall (2085).

Each end cap (2095) and (2100) or tube manifold adaptor comprises a cup shaped attaching end (2105) and a journal shaped supporting end (2110). The attaching end (2105) includes a blind hole sized to receive the outside diameter of the annular wall (2085) therein. Each attaching end (2105) is fixedly attached to a rod end by a press or inference fit or by another fastening means such as brazing or an adhesive bond using materials suitable for the operating temperature of the hot zone, (350-1200° C.). The journal shaped supporting end (2110) includes an annular wall formed with an outside diameter sized to engage with a corresponding through hole passing through the top supporting plate (2070) on the input side and a corresponding through hole passing through the bottom supporting plate (2075) on the output side. The journal shaped supporting end (2110) further includes a through hole passing there through which serves as a cell input port (2115) at the top end of the rod shaped fuel cell or as a cell output port (2120) at the bottom end of the rod shaped fuel cell (2080). Preferably the endcaps (2095 & 2100) or tube manifold adaptors each comprise a high temperature low Cr, corrosion resistant metal alloy thermally compatible with the fuel cell. The caps may be comprised of a ceramic coaling on the metal cap to prevent Cr contamination.

Figure 3:
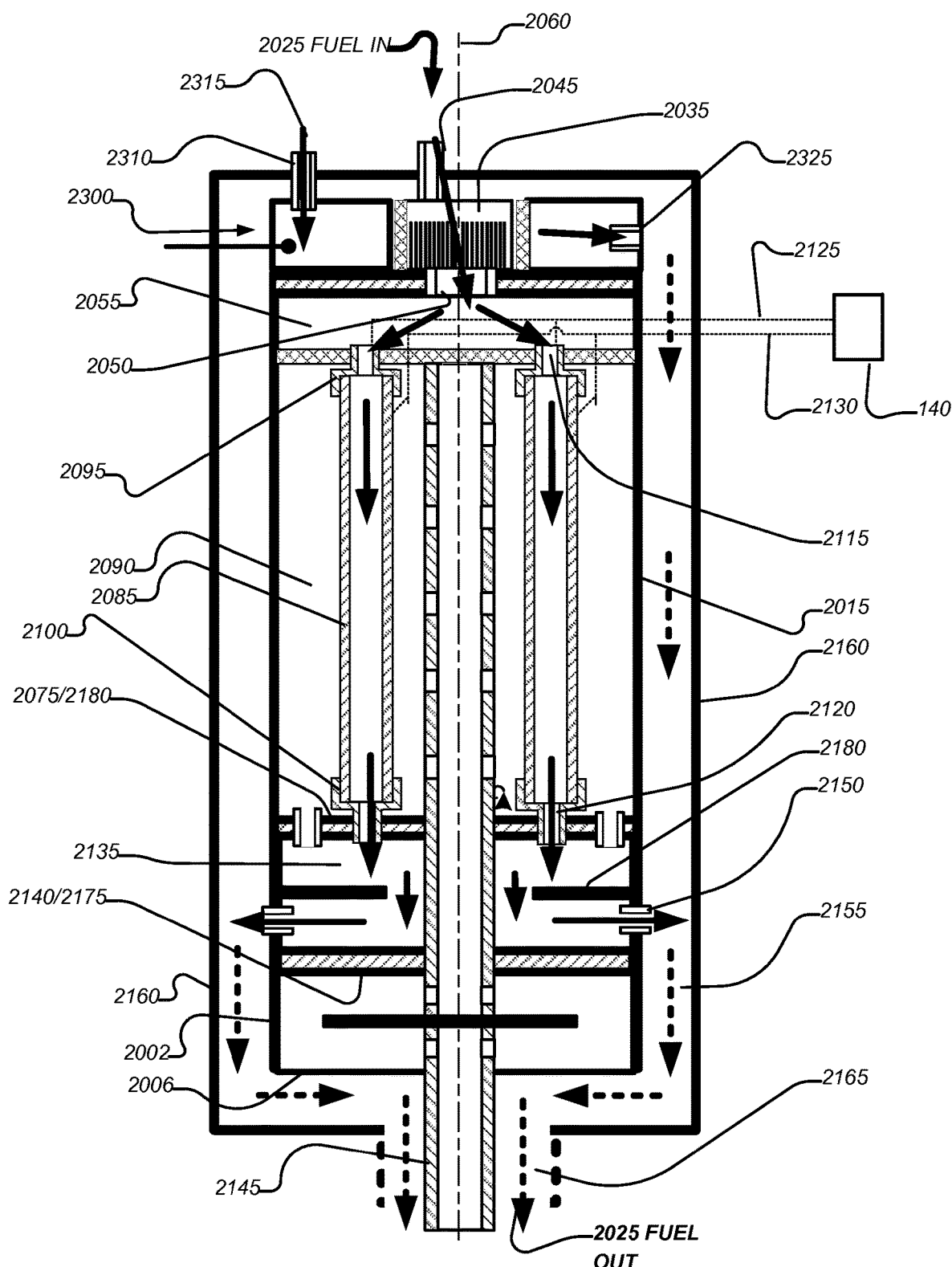
FIG. 3 depicts a schematic view of exemplary fuel flow pathways of a SOFC system according to the present invention.

Referring to FIGS. 2 and 3, the top end cap (2095) of each fuel cell (2080) may provide electrical communication with an outside diameter or cathode layer of the annular wall (2085) such that the outside diameter of the annular wall (2085) is in electrical communication with one of the DC terminals (140) over an electrical lead (2125) through the end cap (2095). A second electrical lead (2130) is in electrical communication with an inside diameter of the annular wall (2085) or anode layer and with a different terminal of the DC terminals (140). Additionally electrical insulators (not shown) are provided between each end cap (2095) and (2100) and the corresponding top and bottom support walls (2070) and (2075) to electrically isolate the hot zone enclosure walls (2015) from electrical current being generated by the cell stack (2005).

Each rod shaped fuel cell is formed by the annular wall (2085) comprises an anode support layer which is a structural anode material layer formed with an inside and an outside diameter. The anode support layer may comprise a cermet comprising nickel and doped zirconia ($ZrO_2$), nickel and doped carta ($CeO_2$), copper and ceria or doped ceria or the like. The outside diameter of the anode support layer annular wall (2085) is a least partially coated with a ceramic electrolyte layer such as a Yttria stabilized zirconia or a cerium (Ce) or lanthanum gallate based ceramic. The outside diameter of the ceramic electrolyte layer is at least partially coated with a cathode material layer such as lanthanum strontium cobalt oxide (LSC), landianum strontium cobalt oxide (LSCF), lanthanum strontium manganite (LSM) or the like.

In a second non-limiting example embodiment of the system (2000) the mechanical structure of the hot zone enclosure walls and internal end walls is similar to that shown in FIG. 2 and described above however; the anode and cathode layers are on opposite sides of the ceramic electrolyte layer. Specifically in the second embodiment the inside diameter of the anode support layer annular wall (2085), (as opposed to the outside diameter), is a least partially coated with a ceramic electrolyte layer such as a Yttria stabilized zirconia or a cerium (Ce) or lanthanum gallate based ceramic and the inside diameter of the ceramic electrolyte layer is at least partially coated with a cathode material layer such as lanthanum strontium cobalt oxide (LSC), lanthanum strontium cobalt oxide (LSCF), lanthanum strontium manganite (LSM) or the like. In this example embodiment the anode support layer of the annular wall (2085) is an outside diameter of each fuel cell and the inside diameter of each fuel cell is the cathode layer. Thus in the second example embodiment the cathode chamber (2090) becomes an anode chamber and fuel is delivered into the anode chamber while the cathode gas, air is (lowed through the rod shaped fuel cells.

The fuel mixture (2025) is flowed over the anode material layer while the cathode gas, oxygen (air) is flowed over the cathode material layer in order to generate electrical current flow. The current How passes out of the cell stack over the electrical terminals (2125) and (2130) to the DC terminals (140) and may be used to power external devices. It is noted that in other embodiments such as the second embodiment briefly described above, the anode and cathode surfaces can be reversed with the cathode layer on the inside diameter of the fuel cells and the anode layer on the outside diameter of the fuel cells and air flowing through the gas flow conduit formed by the fuel cells and fuel flowing over outside surface of the fuel cells without deviation from the present invention.

The fuel input manifold (2055) comprises a cylindrical chamber bounded by a disk-shaped top wall (2170) and the opposing disk shaped top tube support wall (2070). The disk-shaped top wall (2170) includes a thermally conductive mass (2160). The thermal mass (2160) comprises one or more materials having a coefficient of thermal conductivity of more than 100 W/(m° K) and preferably more than 200 W/(m° K) such as one or more of copper, molybdenum, aluminum copper, copper nickel alloys or a combination thereof. The thermal mass (2160) is in thermally conductive communication with the hot zone enclosure walls (2015) und specifically with the sidewall (2002). The thermally conductive mass (2160) is positioned proximate to an annular cold start combustion chamber (2305), described below, in order to receive thermal energy from fuel that is combusted within the cold start chamber (2305) during startup and to thermally conduct thermal energy received therefrom to the hot zone external walls (2015). Additionally, the thermally conductive mass (2160) radiates thermal energy received from fuel combustion within the cold start chamber (2305) and received by thermal conduction through the hot zone enclosure walls to fuel (2025) as it passes through the fuel input manifold (2055).

The top tube support wall (2070) forms a gas tight seal with the supporting ends (2110) of each of the fuel cell top end caps (2095). Additionally each of the fuel cells (2080) is fixedly hung from the top support wall (2070) by the mechanical interface formed in the top supporting wall (2070) which includes through holes for receiving the supporting ends (2110) or manifold adaptors there through. Additionally the fuel input manifold (2055) is bounded by the cylindrical sidewall (2002).

Since the present exemplary embodiment utilizes a CPOX reformer (2020) which uses an exothermal reaction to reform fuel, the reformer (2020) is a thermal energy source which is beneficially disposed inside the hot zone (2000) to heat incoming fuel (2025) as the fuel enters the hot zone. However in other embodiments of SOFC systems of the present invention the reformer (2020) may utilize an endothermic reaction, e.g. a steam reformer or a thermally neutral reaction e.g. an autothermic reformer to reform the fuel and in these cases the reformer (2020) would be more beneficially disposed outside the hot zone (2000) and placed instead in the cold zone (110), shown in FIG. 1. Thus the improved hot zone (2000) of the present invention can be operated without a reformer (2020) without deviating from the present invention.

5.4 Tail Gas Combustor

The tail gas combustor or combustor region (2135) is an annular volume disposed between the disk shaped bottom tube support wall (2075), which includes a thermal mass (2180), both described above and shown in FIG. 5D, and a disk-shaped combustor end wall (2140) which also includes a thermal mass (2175). Both thermal masses (2180) and (2175) comprise one or more materials having a coefficient of thermal conductivity of more than 100 W/(m° K) and preferably more than 200 W/(m° K) such as one or more of copper, molybdenum, aluminum copper, copper nickel alloys or a combination thereof. The thermal masses (2180) and (2140) are positioned to receive thermal energy from the combustion region (2135) and are configured to conduct the thermal energy received from the combustion region to the hot zone enclosure walls (2015) as well as to radiate the thermal energy received from the combustion region into the cathode chamber (2090) and the recuperator chamber (2210).

An annular combustor baffle (2185) is provided inside the annual combustor region to redirect gas flow through the combustor region (2135) and create turbulence which increases convective energy transfer to the side walls of the combustor region (2135). The combustor baffle (2185) may be fixedly attached to the hot zone enclosure side wall (2002) or may comprise a portion of a combustion chamber liner described below.

A cathode feed tube (2145), described below, passes through the combustor region (2135) along the central longitudinal axis (2060). The walls of the cathode feed tube (2145) are heated by convective thermal energy transfer from combustion gases inside the combustor region (2135). Air flowing through the cathode feed tube (2145) toward the cathode chamber (2090) is heated by thermal energy radiated from the cathode feed tube (2145) to the air flowing there through.

Internal walls of the combustor region (2135) are lined with a high temperature, corrosion resistant metal such a Hastelloy alloy. In the case of the wall disk shaped bottom tube support wall (2140), the surface facing the combustor region comprises Hastelloy. In the case of the combustor region end wall (2175), the surface facing the combustor region comprises Hastelloy. In each case the wall (2075) and (2175) is formed as a composite structure having a Hastelloy disk shaped liner in thermally conductive contact with the corresponding thermal mass (2180) and (2140) respectively. The cylindrical side wall of the combustor region (2135) is also lined with a high temperature, corrosion resistant metal such a Hastelloy variation which is a nickel based alloy at least containing cobalt, chromium and molybdenum. In one non-limiting example embodiment the sidewall liner comprises separate element formed as a tube shaped open ended cylindrical wall with the combustor baffle (2185) formed integral therewith. Moreover the side wall liner is formed to be inserted into the hot zone enclosure sidewall (2002) and from either of its open ends and to make thermally conductive contact with the side wall (2002) substantially over the entire surface of the wall liner.

5.5 Recuperator

Air (2200) enters the cathode feed tube (2145) through an input port (2205) and flows into a recuperator chamber (2210). The recuperator chamber (2210) is positioned in close proximity to the tail gas combustor region (2135) in order to heat incoming air (2200) using thermal energy generated by combustion of the spent fuel occurring inside the combustor region (2135). The recuperator chamber (2210) is an annular chamber surrounding the cathode feed tube (2145) and is bounded on a top side by the disk-shaped combustor end wall (2140), on a bottom side by the disk shaped hot zone enclosure bottom wall (2006) and on its sides by the hot zone enclosure cylindrical side wall (2002).

Thermal energy is conducted to walls of the recuperator chamber (2210) by the hot zone enclosure walls (2105), by the combustor end wall (2140) and to a lesser extent by the cathode feed tube (2145). Thermal energy is radiated from the recuperator chamber walls to the air (2200) as it passes through the recuperator chamber (2210). Outside walls of the recuperator chamber (2210) are further heated by hot exhaust gasses exiting from the combustor region (2135). In particular the recuperator chamber (2210) is surrounded by the air gap (2155) which carries hot exhaust gases exiting from the combustor region (2135) through exit ports (2150) to the hot zone exit port (2165). Thermal energy from hot exhaust gases heats outside wall portions of the recuperator chamber walls by convective heat transfer A recuperator baffle (2215) is disposed inside the recuperator chamber (2210) and passes through the cathode feed tube (2145) preventing air flow through the cathode feed tube (2145). Thus air (2200) entering the cathode feed tube (2145) through the port (2205) impinges on the recuperator baffle (2215) inside the cathode feed tube and is forced into the recuperator chamber (2210) through one or more air input ports (2225). The input air (2200) flowing into the recuperator chamber through the air input ports (2225) passes around the recuperator baffle (2215) and reenters the cathode feed tube through one or more air output ports (2235) after being heated in the recuperator chamber (2210).

5.6 Cold Start Combustor

Referring to FIG. 2, the SOFC hot zone (2000) optionally includes a cold start fuel combustor provided to initially heat the hot zone to an operating temperature above 350° C. or at least until spontaneous combustion occurs in the tail gas combustor region. The cold start fuel combustor includes an annular startup combustion chamber (2305). The startup combustion chamber (2305) surrounds the catalyzing cavity (2035) and the annular thermal insulation (2065). The startup combustion chamber (2305) is bounded on top by the disk shaped hot zone enclosure top wall (2004) and on bottom by the disk-shaped fuel input manifold top wall (2170), which includes the annular thermal mass (2175). The startup combustion chamber (2305) is further bounded by the hot zone enclosure sidewall (2002).

A startup combustor inlet port (2310) receives uncatalyzed fuel therein from a fuel source, not shown. The uncatalyzed fuel may comprise various combustible gaseous or vaporized liquid fuels such as natural gas, propane, methane, hydrogen alcohol, or a mixture of fuels and air. The uncatalyzed fuel is delivered into the startup combustion chamber (2305) through the combustor inlet port (2310) and is ignited by an electric spark igniter (2320).

During startup combustion, thermal energy generated by fuel combustion inside the startup combustion chamber (2305) is transferred by convective thermal energy transfer to the hot zone enclosure top wall (2004) and sidewall (2002) as well as to the fuel input manifold top wall (2170). From each of these walls the thermal energy from startup combustion is thermally conducted to other regions of the hot zone by the thermal conductive hot zone enclosure walls (2015).

Exhaust gases from the start up combustion exit the startup combustion chamber (2305) through the combustor outlet port (2325) which is in fluid communication with the air gap (2155) which leads to the hot zone exit port (2165). Thus the exhaust gases flowing from the startup combustion chamber (2305) to the hot zone exit port (2165) further heat external surfaces of the hot zone enclosure walls (2015) by convective heat transfer.

Internal walls of the startup combustion chamber (2305) are lined with a high temperature, corrosion resistant metal such a Hastelloy variation which is a nickel based alloy at least containing cobalt, chromium and molybdenum. In the case of the disk shaped hot zone enclosure top wall (2004) this wall is lined with a Hastelloy material layer on its inner surface wherein the Hastelloy layer is in thermally conductive contact with the hot zone enclosure top wall (2004). In the case of the disk-shaped fuel input manifold top wall (2170), a top side of this wall comprises a Hastelloy material layer in thermally conductive contact with the annular thermally conductive mass (2175). In the case of the side walls a cylindrical wall liner comprising a Hastelloy material is inserted into the startup combustion chamber in thermally conductive contact with the hot zone enclosure wall (2002).

5.7 Gas Flow Diagrams

5.7.1 Fuel Flow Diagram

Referring now to FIG. 3 a schematic fuel flow diagram depicts the flow path of the air fuel mixture (2025) as it passes through the hot zone (2000). The fuel (2025) enters the reformer input port (2045) and passes through the reformer catalyzing zone (2035) for catalyzation. The catalyzed fuel exits the reformer through the reformer exit port (2050) and enters the input manifold (2055). From the input manifold (2055), fuel enters each of the fuel cells or annular walls (2085) through corresponding cell input ports (2115) and flows through each fuel cell and exits the fuel cells through corresponding cell output ports (2120). Inside the fuel cell (2080) the fuel reacts with the anode material layer forming the inside surface of the cell annular walls (2085). After exiting the fuel cells through the cell exit ports (2120) the remaining fuel air mixture (2025), which comprises unreacted fuel and reaction by-products enters the combustor region (2135) where it mixes with air exiting from the cathode chamber (2090) forming a mixture which is spontaneously combusted therein. As described above, thermal energy generated by combustion in the combustor region (2135) is convectively transferred to side walls of the combustor region and thermally conducted to other regions of the hot zone through the hot zone enclosure walls (2015). Additionally thermal energy generated by combustion in the combustor region (2135) may be transfer to each of the thermally conductive masses (2175) and (2180) proximate to the combustor region by gas to surface thermal transfer by convection and thermal conduction through the enclosure walls. Additionally the thermally conductive masses (2175) and (2180) proximate to the combustor region respectively radiate thermal energy into the recuperator chamber (2210) and the cathode chamber (2090) to heat air passing there through.

After combustion exhaust gases from the combusted mixture (shown as grey arrows) exit the combustor (2135) through one or more combustor exit ports (2150) to the air gap (2155). From the air gap (2155) the exhaust gas from the combusted mixture exit the hot zone through a hot zone exit port (2165).

5.7.2 Fuel Flow Diagram Cold Start

As further shown in FIG. 3, unreformed fuel (2315) enters the startup combustion chamber (2305) through the startup combustor inlet port (2310) where the fuel is combusted.

After combustion exhaust gases (shown as grey arrows) exit the combustor (2135) through one or more startup combustor exit ports (2325) to the air gap (2155). From the air gap (2155) the exhaust gas from the startup combustor exit the hot zone through a hot zone exit port (2165).

5.7.3 Air Flow Diagram

Figure 4:
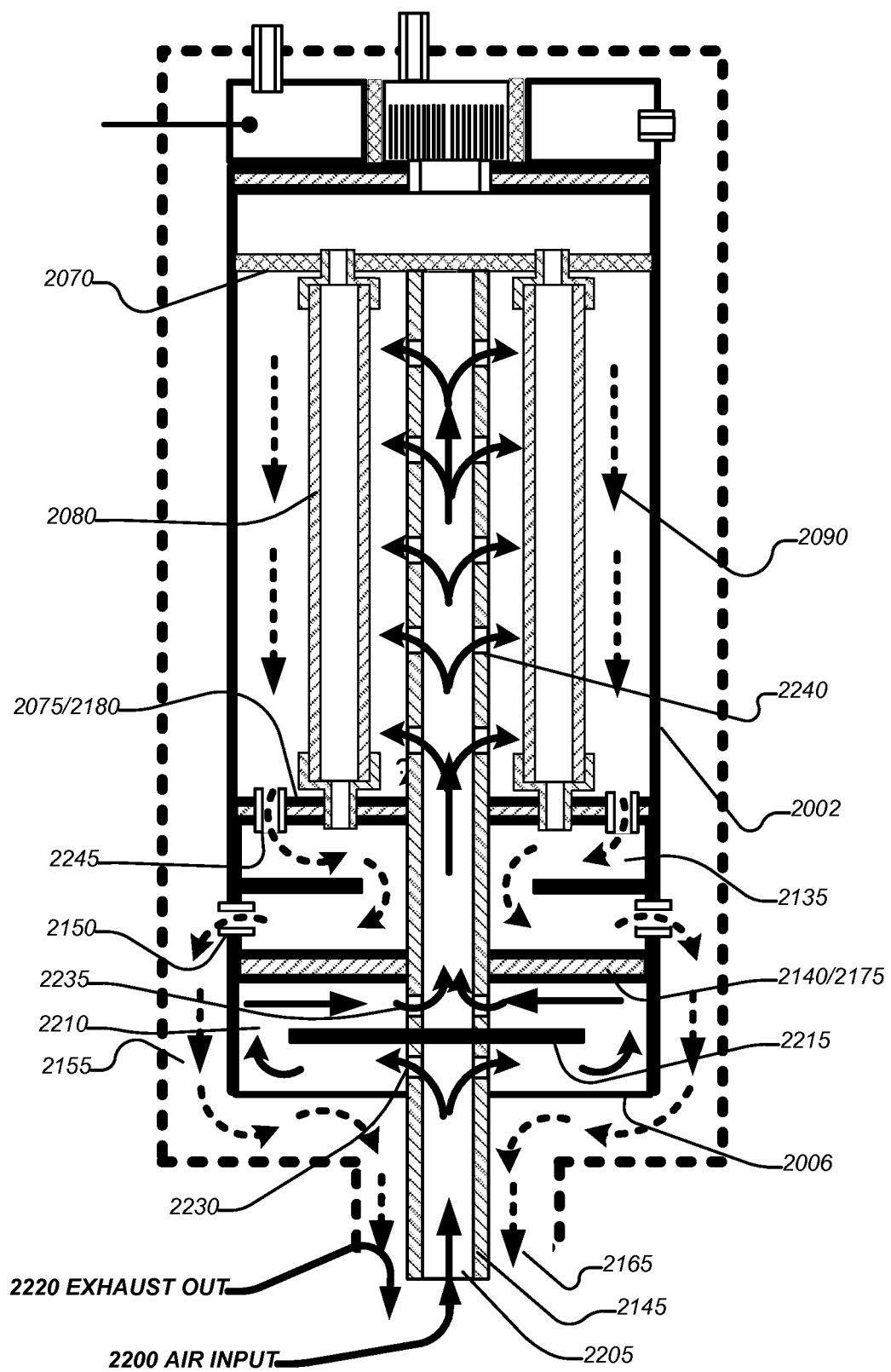
FIG. 4 depicts a schematic view of exemplary air flow pathways of a SOFC system according to the present invention.

Referring now to FIG. 4 a schematic air flow diagram depicts the flow path of air (2200) as it passes through the hot zone (2000). The air (2200) enters the cathode feed tube (2145) through an air input port (2205). The air (2200) exits the cathode feed tube through a recuperator air input port (2230) to enter the recuperator chamber (2210). Air flows around the recuperator baffle (2215) and reenters the cathode feed tube (2145) through a recuperator air output port (2235). Inside the recuperator chamber (2210) the air (2200) is heated by thermal energy radiated from the recuperator chamber walls (2006), (2002) and the combustor end wall (2140) and associated the annular thermally conductive mass (2175).

The air (2200) passes through the combustor region (2135) as it flows through cathode feed tube (2145). In the combustion region the air is further heated by thermal energy radiating from surfaces of the cathode feed tube (2145) before entering the cathode chamber (2090) while still flowing through the cathode feed tube (2145). The air (22(00) exits the cathode feed tube and enters the cathode chamber (2090) through a plurality of cathode chamber air input ports (2240) disposed along a portion of the length of the cathode feed tube (2145) that extends into the cathode chamber (2090).

Once inside the cathode chamber (2090) the air (2200) fills the cathode chamber and impinges on the outside diameter or cathode layer of each of the fuel cells (2080) and reacts with the cathode material layer coated over at least a portion of the outside diameter of each of the fuel cells. The reaction between air passing over the cathode material layer coupled with the reaction of fuel passing over the anode material layer forming the inside diameter of each of the fuel cells generates a current flow which is conveyed to the DC terminals (140) over the electrical leads (2125) and (2130) shown in FIG. 3.

After reacting with the cathode material layers coated on each of the fuel cells, the oxygen depleted air (2200), (shown as dashed flow lines) exits the cathode chamber (2090) through one or more cathode chamber output ports (2245) which lead into the combustor region (2135). In the combustor region (2135) the oxygen depleted air mixes with hydrogen depleted fuel exiting from the fuel cells and the mixture of is combusted. Exhaust gasses from the combusted mixture exit die combustor region (2135) through the combustor exit ports (2150) which lead to the air gap (2155). The air gap (2155) carries the exhaust gasses to the hot zone exit port (2165) and out of the hot zone.

While FIG. 4 schematically shows two diametrically opposing recuperator air input ports (2230). Iwo diametrically opposing recuperator air output pons (2235) and pairs of two diametrically opposing cathode chamber air input ports (2240), however the actual device may include any hole pattern having one or more holes arranged around the circumference of the cathode feed tube (2145) as required for air flow distribution. Similarly FIG. 4 shows two diametrically opposed cathode chamber air output ports (2245) and two diametrically opposing combustor exit ports (2150), however, the actual device may include any hole pattern having one or more holes arranged around the circumference of the disk shaped wall (2070) or the cylindrical side wall (2002) as may be required for air flow distribution. Alternate any of the gas pons described above may have non-circular shapes e.g. square, rectangular, and oval or slotted without deviating from the present invention.

5.8 Enclosure Wall Surface Treatments

According to an aspect of the present invention no copper surface is exposed to oxygen/air in order to avoid oxidation damage to the copper. This includes all surfaces forming the entire fuel flow pathway and all surfaces forming die entire airflow pathway since both the fuel and the air contain or could contain oxygen. Copper surfaces that may be exposed to fuel flow or to air flow are at least protected by a layer of nickel plating applied to a thickness of 0.0005 to 0.0015 inches, (12.5 to 38.1 µm) by electro-deposition plating or the like. The thickness of the nickel plating is more than 100 times the normal thickness of conventional nickel electro-deposition coatings and the thicker nickel coating is used to substantially prevent oxygen diffusion through the nickel coating.

This aspect of the present invention is shown in FIG. 5A which depicts a non limiting exemplary section view taken through any one of the hot zone cavity walls (2015). The hot zone cavity wall section (5005) includes a copper core (5010) comprising copper having a thermal conductivity approximately ranging from 370 W/(m° K) at 500° C. and 332 W/(m° K) at 1027° C. The copper core (5010) has a thickness in the range of 0.01-0.125 inches (0.25-3.2 mm) however other thicknesses are usable without deviating from the present invention. More generally the hot zone cavity wall thickness may increase or decrease a needed tor a particular application. Generally thicker enclosure walls e.g. up to about 0.25 inches take longer to heat to a desired operating temperature but have the advantage that once heated to the operating temperature the thicker walls have a higher capacity for thermal conduction and are less prone to thermal gradient formation and provide a longer operating life than thinner walls when surface oxidation is the failure mode simply because it takes long to for thicker walls oxidize to a degree that the wall becomes unusable.

The copper core (5010) includes two opposing surfaces forming inside and outside surfaces of the enclosure wall and in a preferred embodiment each of the inside and outside surfaces of the copper core (5010) is completely covered by electro-deposition nickel coaling layers (5015) on the inside surface and (5020) on the outside surface. Each nickel coating layer is applied to a layer thickness of at least 0.0005 inches. (12.5 µm) which is suitably thick to prevent oxygen diffusion through the nickel coating layer. More generally a desired nickel coating layer thickness in the range of 0.0005 to 0.0015 (12.5 to 38.1 µm) provides adequate surface protection from oxidation for a product life of up to about 40,000 hours and thicker nickel coatings are usable to increase product life time without deviating from the present invention. Referring to FIG. 2 the wall section (5005) is at least representative of outer walls of the hot zone enclosure walls (2015) including the cylindrical side wall (2002), the disk-shaped top wall (2004), the disk shaped bottom wall (2006) and may be representative of some walls of the reformer enclosure walls (2030).

According to an aspect of the present invention combustion chamber surfaces are lined with a high temperature, corrosion resistant metal such a Hastelloy alloy in order to protect internal surfaces of the combustion chamber from surface damage from exposure to high temperatures, combustion byproducts and corrosive elements. Alternate Monel or Inconel is usable without deviating from the present invention.

This aspect of the present invention is shown in FIG. 5B which depicts a non-limiting exemplary section view (5025) taken through a combustion chamber cylindrical side wall. The side wall section (5025) includes the copper core (5010) of the hot zone enclosure side wall (2002) and the electro-deposition nickel coating layers (5015) and (5020) applied over opposing sides of the copper core as described above. Specifically the section view (5025) includes the same hot zone external wall (5005) shown in FIG. 5A. In addition the combustion chamber side wall section (5025) further includes a Hastelloy alloy liner (5030) positioned to line the inside surface of the combustion chamber. Referring to FIG. 2 the cylindrical side wall section (5025) is at least representative of cylindrical outer wall of the annular tail gas combustion region (2135) and the cylindrical outer wall of the annular cold start combustion region (2035). The sidewall section (5025) shows the hot zone cylindrical wall (2002) protected by the Hastelloy alloy liner element (5030). In the specific example of the tail gas combustor chamber (2135) the Hastelloy alloy liner element (5030) also includes the combustor battle (2185) attached thereto or formed integral therewith. However except for the presence of the combustor baffle (2185) the section (5025) is also representative of the top and side walls of the annular cold start combustor cavity (2305).

Each of the annular combustor chambers (2135) and (2305) is also lined by a pair of opposing disk shaped Hastelloy alloy liner elements positioned to line the inside top and the inside bottom surfaces of the combustor region. In the case of the tail gas combustor region (2135) its chamber top wall is formed by the bottom tube support wall (2075) which includes a disk shaped Hastelloy alloy liner element (5050), shown in FIG. 5C. The liner element (5050) is disposed to face the inside of the annular tail gas combustor region or chamber (2135). The tail gas combustor region bottom wall is formed the combustor end wall (2175) which also includes a disk shaped Hastelloy alloy liner (5060) facing the inside of the annular combustor region chamber (2135).

In the case of the annular combustion cavity (2305) of the cold start combustor its top chamber wall is formed by the hot zone enclosure top wall (2004) which includes an annular shaped Hastelloy alloy liner clement (5030) in contact with the inside top wall of the annular combustor chamber (2305). Specifically the hot zone enclosure top wall (2004). also the top wall of the cold start annular combustion cavity (2305) is detailed in the section view of FIG. 5B which shows the copper core (5010) covered by electrodeposited nickel layers (5015) on the inside surface and (5020) on the outside surface and includes a Hastelloy alloy liner element (5030) in contact with the nickel layer (5015). While the section view (5025) is vertically oriented und includes the Hallestoy baffle (2185) the section is the same as the top wall (2004) without the baffle (2185) and rotated to a horizontal orientation like the top wall (2004).

The bottom wall of the annular combustion cavity (2305) is formed by the top wall of the fuel input manifold (2170). This wall also includes an annular shaped Hastelloy alloy liner element (5060), similar to the one shown in FIG. 5D, in mating contact with the inside bottom wall of the annular combustor chamber (2305).

According to an aspect of the present invention no incoming air (2200) is exposed to a surface that is formed from a material that includes chromium in order to avoid poisoning the cathode layer applied to exterior surfaces of the fuel cells (2080). This includes all surfaces forming the entire incoming air flow pathway which includes interior surfaces of the cathode feed tube (2145), the recuperator chamber (2210), the recuperator baffle (2215), exterior surfaces of the cathode feed tube (2145), interior surfaces of the cathode chamber (2090) and elements housed within the cathode chamber including the fuel cell end caps (2095) and (2100) and the top and bottom fuel cell support walls (2070) and (2075).

In one non-limiting exemplary embodiment, the cathode feed tube (2145), the recuperator baffle (2215) and each of the bottom end caps (2100) are formed from a high temperature metal alloy that is chromium free and resistance to corrosion; e.g. a Monel alloy. Additionally at least a bottom surface of the combustor end wall (2140) which forms a top surface of the recuperator chamber (2210) is formed by or lined by a protective element formed from a high temperature metal alloy that is chromium free and resistant to corrosion; e.g. a Monel alloy. Similarly at least a top surface of the bottom tube support wall (2075) which forms a bottom surface of the cathode chamber (2090) is formed by or lined by a protective element formed from a high temperature metal alloy that is chromium free and resistance to corrosion; e.g. a Monel.

Internal surfaces associated with incoming air flow that are coated with the above descried electro-deposited nickel plating layer can be exposed to air flow without exposure to chromium. Nickel plated surfaces that may contact incoming air flow include the cylindrical side wall (2002) which forms the sidewall of each of the recuperator chamber (2210) and the cathode chamber (2090), and the disk shaped bottom wall (2006) which forms the bottom wall of the recuperator chamber (2210). The surfaces each have a cross-section (5005) shown in FIG. 5A. Additionally other surfaces inside the cathode chamber (2090) formed by chromium containing materials such as the top tube support wall (2070) and the top end caps (2095) which are each formed from Inconel are covered by a layer of nickel plating applied to a thickness of 0.0005 to 0.0015 inches, (12.5 to 38.1 µm) electro-deposition plating or the like in order to avoid air contamination with chromium.

Referring now to FIG. 5C a detailed section view depicts a section (5040) taken through the bottom tube support wall (2075). The detailed section view shows the thermally conductive mass (2180) which comprises a copper mass having a thermal conductivity approximately ranging from 370 W/(m° K) at 500° C. and 332 W/(m° K) at 1027° C. The copper mass (2180) has a thickness in the range of 0.01-0.375 inches (2.5-9.5 mm) however other thicknesses are usable without deviating from the present invention. A top surface of the wall (2075) faces the inside of the cathode chamber (2090) und is therefore lined with a disk shaped liner element (5045) formed from a high temperature metal alloy that is chromium free and resistant to corrosion; e.g. a Monel alloy in order to avoid contaminating the cathode gas with chromium. A bottom surface of the wall (2075) faces the tail gas combustion region (2135) and is lined with a disk shaped liner (5050) formed from a Hastelloy alloy.

Referring now to FIG. 5D a non-limiting exemplary detailed section view depicts a section (5055) taken through the combustor end wall (2175). The detailed section shows the thermally conductive mass (2140) which comprises a copper mass having a thermal conductivity approximately ranging from 370 W/(m° K) at 500° C. and 332 W/(m° K) at 1027° C. The copper mass (2175) has a thickness in the range of 0.01-0.375 inches (2.5-9.5 mm) however other thicknesses are usable without deviating from the present invention. A lop surface of the wall (2140) faces the inside of the tail gas combustor region (2135) and is therefore lined with an annular liner element (5060) formed from a solid Hastelloy alloy. A bottom surface of the wall (2140) faces the recuperator chamber (2210) and is lined with an annular liner (5065) formed from a high temperature metal alloy that is chromium free and resistant to corrosion; e.g. a Monel alloy.

Figure 5E:
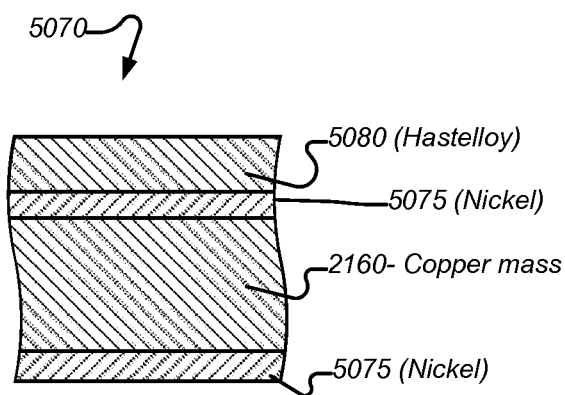
FIG. 5E depicts a section view taken through an exemplary combustion region bottom wall including a thermally conductive mass of a SOFC system according to the present invention.

Referring now to FIG. 5E a non-limiting exemplary detailed section view depicts a section (5070) taken through the fuel input manifold top wall (2170). The detail section view shows the thermally conductive mass (2160) which comprises a copper mass having a thermal conductivity approximately ranging from 370 W/(m° K) at 500° C. and 332 W/(m° K) at 1027° C. The copper mass (2160) has a thickness in the range of 0.01-0.375 inches (2.5-9.5 mm) however other thicknesses are usable without deviating from the present invention. Opposing top and bottom surfaces of the copper mass (2160) are optionally covered by a layer of nickel plating (5075) applied Co a thickness of 0.0005 to 0.0015 inches, (12.5 to 38.1 µm) by electro-deposition plating or the like. The nickel plating is applied in order to avoid contact between fuel (2025) and the copper mass (2160) to avoid oxidizing the copper mass surfaces. A top surface of the wall (2170) faces the inside of the annular cold start combustion cavity (2305) and is therefore lined with an annular liner element (5080) formed from a solid Hastelloy alloy to protect the thermal mass (2160) from thermal damage.

A further variation of the walls (2075) and (2175) shown in detail in FIGS. 5C and 5D is that both sides of the copper mass (2180) and (2175) are covered by a layer of nickel plating applied to a thickness of 0.0005 to 0.0015 inches, (12.5 to 38.1 µm) by electro-deposition plating or the like as described above e.g. with respect to FIG. 5E. The nickel plating is included in order to avoid contact between fuel (2025) and or air (2200) and the corresponding copper mass (2180) and (2175) so that oxidizing the copper mass surfaces is avoided. In cases where the Hastelloy elements (5050) and (5060) and the Monel elements (5045) and (5065) comprise separate liner elements, i.e. not integrally funned with the copper mass (2180), the copper mass is preferably nickel plated on both of its opposing surfaces (e.g. as shown in FIG. 5A). However in other cases where the disk or annular shaped liner elements (5045). (5050), (5060), (5065) are integrally formed with the copper mass (2180) and or (2175) nickel plating the copper mass may not be needed.

Generally Hastelloy and Monel elements described above are used to protect various surfaces from damage or in avoid contaminating incoming air by contact with chromium containing surfaces such as Inconel or Hastelloy surfaces. In one non-limiting example embodiment one or more protective elements is fabricated separately from the hot zone enclosure walls (2015) and installed in place at assembly such as by brazing a protective material layer onto a surface being protected. In the example copper mass (2180, 2175) shown in FIGS. 5C and 5D the protective Monel and Hastelloy layers are brazed directly to opposing surfaces of the copper mass without nickel plating the copper mass. Preferably the brazing step substantially gas seals the copper mass preventing air or fuel from contacting and oxidizing surfaces of the copper mass.

In the example copper mass (2160) shown in FIG. 5E the protective Hastelloy layer is brazed directly to a nickel layer (5070) of one surface of the copper mass that is disposed inside the combustion region (2135). In this non-limiting example embodiment the Hastelloy layer is installed to protect the copper mass surface from direct exposure to combustion and corrosive elements. On the opposing surface, only a nickel plated protective layer (5070) is applied onto the copper mass surface which is disposed inside the recuperator chamber (2210) since only a nickel layer is needed to protect the copper mass surface from oxidation by incoming air. In the example of FIG. 5F the Hastelloy layer (5080) can be mechanically attached, e.g. by fasteners or clamped in place, without the need to gas seal the copper surface since the copper surface is already protected by the nickel layer (5075) disposed between the coper mass (2160) and the Hastelloy layer (5080).

Thus as described above, and particularly with respect to FIGS. 5B, 5C, 5D and 5E the Hastelloy and Monel elements may include a plurality of separate elements such as disk shaped elements (5040), (5050), (5060), (5065) (5080) in mating contact with disk shaped thermal mass elements (2180), (2175), (2160) or the Hastelloy and Monel elements may include cylindrical wall portions e.g. (5030) disposed in mating contact with internal cylindrical wall surfaces of combustion chambers such as the cylindrical side wall (2002) of the hot zone enclosure walls. The cylindrical wall portions are inserted in appropriate positions inside the hot zone enclosure walls, e.g. inside the cold start combustor chamber (2305) and inside the tail gas combustor region (2135) and brazed, welded or otherwise fastened or clamped in place in mating contact with surfaces being protected. In some embodiments the Hastelloy and Monel elements may be applied directly to the conductive core surface (e.g. brazed directly onto a surface of the thermally conductive mass) with a substantially gas light seal. In other embodiments the thermally conductive mass or core wall surface is nickel plated and the Hastelloy or Monel elements may be applied over the nickel plating without the need to provide a substantially gas seal and instead of brazing over the entire surface to provide a gas seal the elements may be held in place by clamping, by mechanical fasteners or by brazed or spot welded at selected points. In further embodiments any of the above described wall structured may be formed as a metal casting with various protective material layers formed on selected surfaces of the metal casting by well-known methods including plating, sputtering, spray coating hot dipping or the like.

However in other non-limiting embodiments of the present invention portions of the external and or internal walls of the hot zone enclosure walls (2015) are formed from pre-fabricated multi-layered composite materials. The composite materials including plate and or tubing stock fabricated with a plurality of dissimilar metals layers which are usable to form various hot zone enclosure walls described herein.

In a final step sheets of dissimilar metals are joined together by an extrusion or rolling process generally referred to as cladding. In an example embodiment, referring to FIG. 5C, a composite sheet comprising a copper mass (2180), a Hastelloy alloy layer (5050) and a Monel alloy layer (5045) are roll welded to form the composite sheet. Once formed, the wall (2075) may be cut from the composite sheet and holes and other features added in secondary operations. The wall (2075) is then assembled to the hot zone enclosure walls (2015) by brazing, welding, mechanical fastening, clamping, high temperature adhesive bonding or the like. Additionally the wall (2175), shown in FIG. 5D, includes the same material layers as the wall (2075) shown in FIG. 5C only in reverse order, may be cut from the same composite sheet and holes and other features added in secondary operations. Each of the wall (2175) and (2075) is then assembled to the hot zone enclosure walls (2015) by brazing, welding, mechanical fastening, clamping, high temperature adhesive bonding or the like.

In an example embodiment, referring to FIG. 5F, a composite sheet comprising a copper mass (2160) and a Hastelloy alloy layer (5070) are roll welded to form a composite sheet. In this example embodiment the nickel layer (5075) may be omitted such that the composite sheet has only two layers. Once formed, the wall (2170) may be cut from the composite sheet and holes and other features added in secondary operations. The wall (2170) is then assembled to the hot zone enclosure walls (2015) by brazing, welding, mechanical fastening, clamping, high temperature adhesive bonding or the like. In a further step the composite sheet may be nickel plated on at least the copper surface to prevent oxidation of the exposed copper surface.

Similarly referring to FIG. 5B, a two layer composite sheet comprising a copper core (5010) and a Hastelloy layer (5030) are roll welded to form a composite sheet. In this example embodiment the nickel layer (5015) and (5020) may be omitted such that the composite sheet has only two layers. Once formed, holes and other features are formed by secondary operations and then the composite sheet is formed into a cylindrical wall. The cylindrical wall is cut to size and assembled with other cylindrical wall sections to form portions of the hot zone enclosure side wall (2002) associated with enclosing a combustion region. The cylindrical wall portions may be joined together by brazing, welding, mechanical fastening, clamping, high temperature adhesive bonding or the like. In a further step the composite sheet may be nickel plated on one or both sides and the assembled host zone enclosure side wall may be nickel plated to protect exposed copper surfaces from oxidation.

5.9 Further SOFC Fuel Cell Stack Configurations

Figure 6:
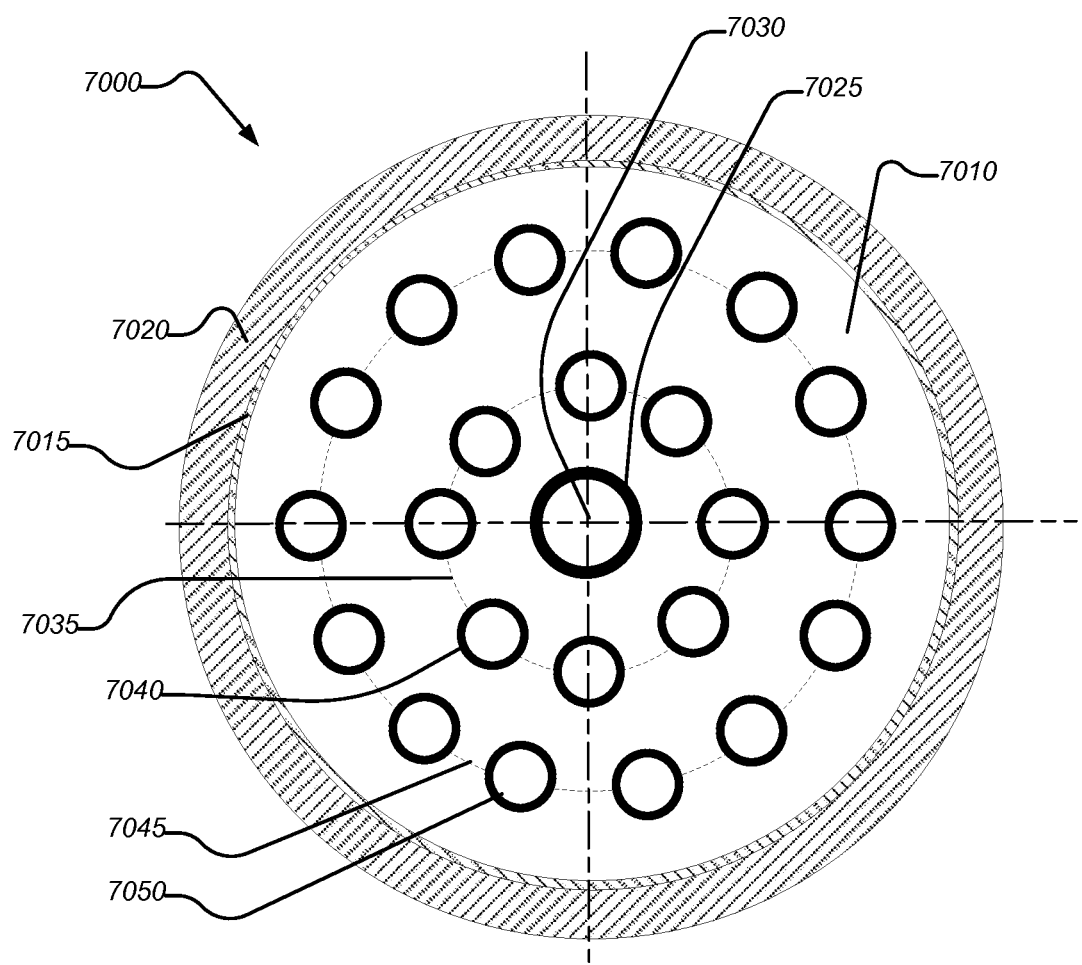
FIG. 6 depicts a schematic top section view of a SOFC system having a plurality of rod shaped fuel cells arranged in two concentric circular patterns according to the present invention.

Referring now to FIG. 6 portions of a non-limiting exemplary embodiment of a SOFC system embodiment (7000) usable with the present invention are shown in a top section view. The configuration (7000) depicts a cathode chamber (7010) enclosed by a circular hot zone enclosure wall (7015) shown in top section view. The circular enclosure wall (7015) is surrounded by a circular thermal insulation layer (7020) separated from the circular enclosure wall by a small air gap, not shown, usable as a gas flow conduit as described above.

A cathode feed tube (7025) is shown centered with respect to the circular hot zone enclosure wall (7015). A plurality of rod shaped fuel cells is disposed in two concentric circular patterns with each circular pattern centered with respect to the same center axes (7030). An inner circular pattern (7035) includes eight inner rod shaped fuel cells (7040). An outer circular pattern (7045) includes fourteen outer rod shaped fuel cells (7050). Other enclosure shapes and fuel cell patterns are usable without deviating from the present invention.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. Solid oxide fuel cell systems), those skilled in the art will recognize that its usefulness is not limited thereto and that the present invention can be beneficially utilized in any number of environments and implementations where it is desirable to increase thermal energy transfer by thermal conduction using high thermal conductivity materials at high temperatures and in corrosive environments. Accordingly, the claims set forth below should be construed in view of the full breadth and spirit of the invention as disclosed herein.

The invention claimed is:

1. A method comprising:
    enclosing a SOFC stack comprising one or more fuel cells inside a hot zone cavity formed by a plurality of hot zone enclosure walls each formed with a core material layer having a coefficient of thermal conductivity of greater than 100 W/(m° K);
    combusting a mixture of spent fuel and spent cathode air inside a tail gas combustor region wherein the tail gas combustion region is inside the hot zone cavity;
    transferring thermal energy from the mixture of spent fuel and spent cathode air that is combusting inside a tail gas combustor region to surfaces of the plurality of hot zone enclosure walls surrounding the hot zone cavity by thermal convection; and,
    transferring thermal energy from the surfaces of the plurality of hot zone enclosure walls surrounding the hot zone cavity to other surfaces distal from the surfaces of the plurality of hot zone enclosure walls surrounding the hot zone cavity by thermal conduction through the core material layer.

2. An Solid Oxide Fuel Cell (SOFC) system comprising:
    hot zone walls defining a hot zone cavity therein and having a thermal mass element forming at least one thermally conductive pathway extending between a hot region and a cold region of the hot zone cavity; and
    a SOFC stack disposed inside the hot zone cavity,
    wherein the thermal mass element reduces thermal gradients in the hot zone cavity by conducting heat from the hot region to the cold region.

3. The SOFC system of claim 2 further comprising a first protective material layer applied over the thermal mass to prevent oxidation of the thermal mass.

4. The SOFC system of claim 2 wherein the thermal mass element is fabricated from one or more materials having a thermal conductivity of greater than 100 W/(m° K) at temperatures above 350° C.

5. The SOFC system of claim 2 wherein the hot zone walls comprise a composite structure comprising the thermal mass element fabricated from the one or more first materials and a first protective material layer formed from a second material with the thermal mass element and the first protective material being joined together with by a cladding process.

6. The SOFC system of claim 2 further comprising a tail gas combustor region disposed inside the hot zone cavity for combusting a mixture of spent fuel and spent cathode gas wherein the tail gas combustor region is bounded at least in part by inside surfaces of the hot zone walls and further by opposing first and second combustor region end walls wherein at least one of the first and second combustor region end walls is formed in part by the thermal mass element.

7. The SOFC system of claim 2 wherein the thermal mass element has a core layer of the one or more first materials jointed to a protective material layer, wherein the protective layer includes a nickel plating layer applied to exposed surfaces of the core layer to a thickness of at least 0.0005 inches and a predominantly metal nickel alloy layer joined together with the nickel plating layer.

8. The SOFC system of claim 2 further comprising a recuperator chamber disposed inside the hot zone cavity for heating a cathode gas entering the hot zone walls wherein the recuperator chamber is bounded at least in part by internal surfaces of the hot zone walls.

9. The SOFC system of claim 2 wherein each of the hot zone walls comprises an outside surface facing away from the hot zone cavity and wherein a first protective material layer is joined together with the outside surface by a cladding process.

10. The SOFC system of claim 2 wherein a recuperator chamber and a tail gas combustor region share a common end wall and the common end wall is at least partially formed by the thermal mass element.

11. An Solid Oxide Fuel Cell (SOFC) system comprising:
hot zone enclosure walls disposed to enclose a hot zone cavity and formed to provide one or more thermally conductive pathways extending between different regions of the hot zone enclosure walls;
a cathode chamber formed inside the hot zone cavity bounded by internal surfaces of the hot zone cavity and by opposing top and bottom cathode chamber end walls;
a SOFC fuel cell stack comprising a plurality of fuel cells disposed inside the cathode chamber; and
at least one thermal mass element disposed inside the hot zone in thermally conductive communication with the hot zone enclosure walls,
wherein the hot zone enclosure walls and the at least one thermal mass element each comprise a core layer fabricated from one or more first materials having a thermal conductivity of greater than 100 W/(m° K), and
wherein exposed surfaces of the hot zone enclosure walls and exposed surfaces of the thermal mass element are protected from oxygen exposure by a protective material layer comprising a second material different from the first material.

12. The SOFC system of claim 11 wherein the one or more first materials comprises copper and the second material comprises a layer of nickel plating.

13. The SOFC system of claim 11 wherein the first material comprises a metal alloy comprising any one of copper, molybdenum, aluminum and copper, and copper and nickel.

14. The SOFC systems of claim 11 wherein the exposed surfaces of the hot zone enclosure walls and the exposed surfaces of the thermal mass element are protected from oxygen exposure by a protective material layer comprising a second material different from the first material that is joint together with the exposed surfaces by a cladding process.

* * * * *